US012555911B2

(12) United States Patent
Amjadi et al.

(10) Patent No.: US 12,555,911 B2
(45) Date of Patent: Feb. 17, 2026

(54) ELECTRONIC DEVICE WITH ANTENNA FOR RADIATING THROUGH REAR WALL

(71) Applicant: Apple Inc., Cupertino, CA (US)

(72) Inventors: Seyed Mohammad Amjadi, Santa Clara, CA (US); Yiren Wang, Cupertino, CA (US); Hao Xu, Cupertino, CA (US); Sidharath Jain, Redwood City, CA (US); Cosan Caglayan, San Mateo, CA (US); Carlo Di Nallo, Belmont, CA (US); Mattia Pascolini, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 51 days.

(21) Appl. No.: 18/630,878

(22) Filed: Apr. 9, 2024

(65) Prior Publication Data

US 2025/0316903 A1 Oct. 9, 2025

(51) Int. Cl.

*H01Q 1/24* (2006.01)
*H01Q 1/22* (2006.01)
*H01Q 1/48* (2006.01)
*H01Q 9/04* (2006.01)

(52) U.S. Cl.

CPC ............. *H01Q 9/0414* (2013.01); *H01Q 1/22* (2013.01); *H01Q 1/48* (2013.01); *H01Q 9/0421* (2013.01)

(58) Field of Classification Search

CPC .. H01Q 1/22; H01Q 1/48; H01Q 1/24; H01Q 9/04; H01Q 9/0414; H01Q 9/0421
See application file for complete search history.

(56) References Cited

U.S. PATENT DOCUMENTS

| | | | | |
|---|---|---|---|---|
| 8,138,977 | B2 | 3/2012 | Zhang et al. | |
| 8,963,784 | B2 * | 2/2015 | Zhu | H01Q 9/30 343/702 |
| 9,070,969 | B2 | 6/2015 | Mow et al. | |
| 9,559,433 | B2 | 1/2017 | Zhou et al. | |
| 9,705,180 | B2 * | 7/2017 | Darnell | H05K 1/028 |
| 10,476,136 | B2 * | 11/2019 | Mow | H01Q 1/48 |
| 10,804,617 | B2 | 10/2020 | Zhou et al. | |
| 11,114,748 | B2 * | 9/2021 | Yarga | H01Q 21/28 |
| 11,909,101 | B2 * | 2/2024 | Compton | H01Q 21/245 |
| 2024/0079777 | A1 | 3/2024 | Wang et al. | |

* cited by examiner

*Primary Examiner* — Tho G Phan
(74) *Attorney, Agent, or Firm* — Treyz Law Group, P.C.; Michael H. Lyons

(57) ABSTRACT

An electronic device may be provided with peripheral conductive housing structures, a rear wall, a first antenna, and a second antenna. The first antenna may have a resonating element formed from the peripheral conductive housing structures. The second antenna may have a folded antenna element overlapping the first antenna. The folded element may be disposed on at least three sides of a substrate. The folded element may follow a meandering path along at least two of the sides. A first end of the folded element may be coupled to a positive feed terminal. A second end of the folded element may be shorted to a conductive chassis. The folded element may exhibit minimum peak current magnitude at a surface of the substrate facing the rear wall, minimizing electromagnetic coupling between the first and second antennas and optimizing a radiation pattern of the second antenna through the rear wall.

20 Claims, 10 Drawing Sheets

ELECTRONIC DEVICE WITH ANTENNA FOR RADIATING THROUGH REAR WALL

FIELD

This relates generally to electronic devices, including electronic devices with wireless communications capabilities.

BACKGROUND

Electronic devices such as portable computers and cellular telephones are often provided with wireless communications capabilities and displays. To satisfy consumer demand for small form factor wireless devices, manufacturers are continually striving to implement wireless communications circuitry such as antenna components using compact structures. At the same time, there is a desire for wireless devices to cover a growing number of communications bands.

Because antennas have the potential to interfere with each other and with components in a wireless device, care must be taken when incorporating antennas into an electronic device. It can be challenging to provide small form factor electronic devices with antennas that still exhibit satisfactory wireless performance despite the presence of nearby antennas and/or other components.

SUMMARY

An electronic device may be provided with wireless circuitry and a housing. The housing may include peripheral conductive housing structures and a rear housing wall mounted to the peripheral conductive housing structures. The electronic device may have a display mounted to the peripheral conductive housing structures opposite the rear housing wall. The electronic device may have a component such as a speaker or vent that is aligned with openings in the peripheral conductive housing structures.

The wireless circuitry may include a first antenna and a second antenna. The first antenna may have an antenna resonating element that includes a segment of the peripheral conductive housing structures. The second antenna may have a folded antenna element that overlaps the segment. The folded antenna element may be disposed on at least first, second, and third sides of a dielectric substrate. If desired, the dielectric substrate may be shared with the component. The folded antenna element may follow a meandering path along at least two of the sides of the dielectric substrate. A first end of the folded antenna element may be coupled to a positive antenna feed terminal. A second end of the folded antenna element may be shorted to a conductive chassis of the electronic device. The folded antenna element may be configured to exhibit minimum peak current magnitude at a surface of the dielectric substrate facing the rear housing wall. This may serve to minimize electromagnetic coupling between the first and second antennas to optimize a radiation pattern of the second antenna through the rear housing wall.

DETAILED DESCRIPTION

Figure 1:
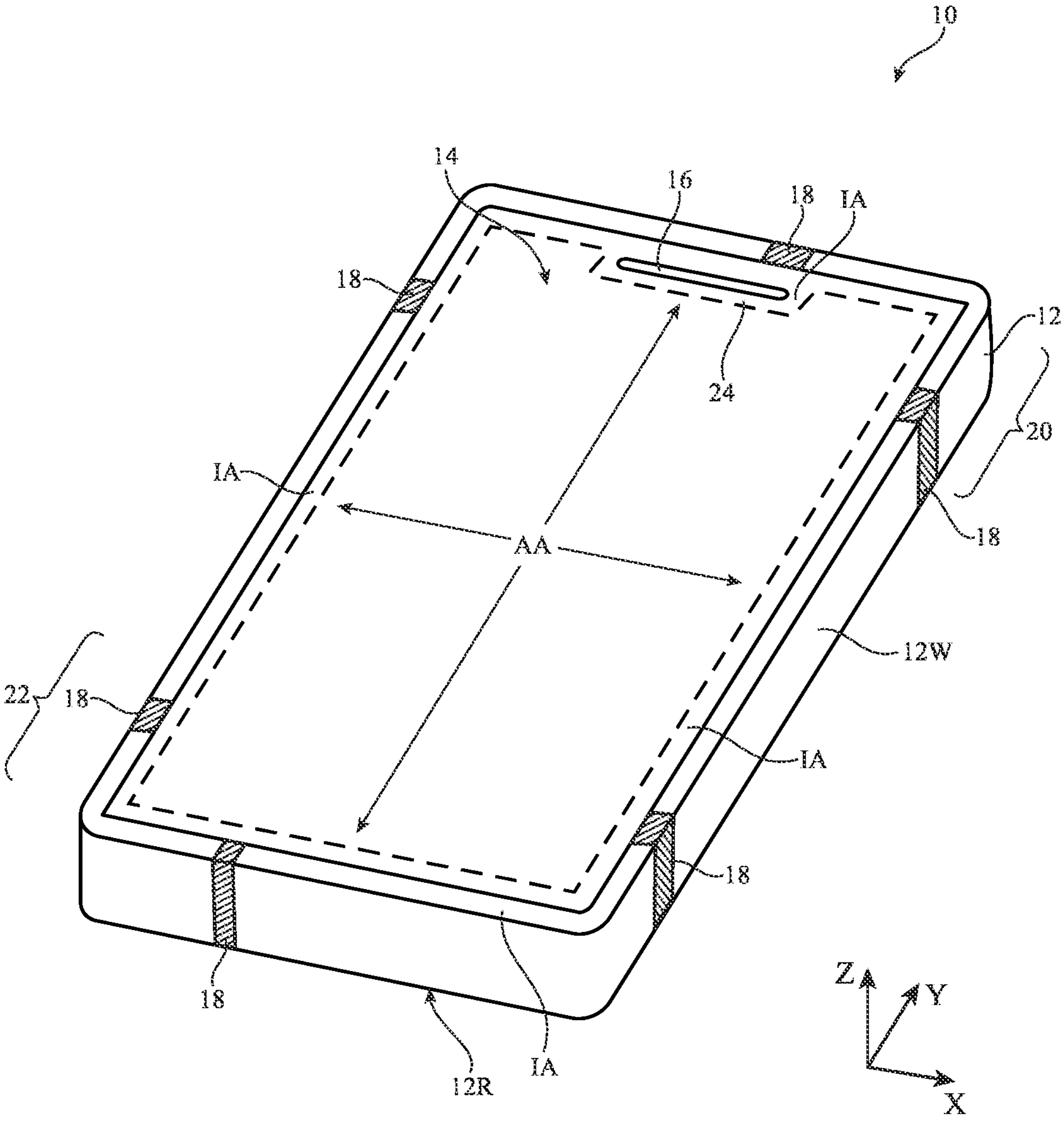
FIG. 1 is a perspective view of an illustrative electronic device in accordance with some embodiments.

An electronic device such as electronic device 10 of FIG. 1 may be provided with wireless circuitry that includes antennas. The antennas may be used to transmit and/or receive wireless radio-frequency signals.

Device 10 may be a portable electronic device or other suitable electronic device. For example, device 10 may be a laptop computer, a tablet computer, a somewhat smaller device such as a wrist-watch device, pendant device, headphone device, earpiece device, headset device (e.g., virtual, augmented, or mixed reality glasses or goggles), or another wearable or miniature device, a handheld device such as a cellular telephone, a media player, or another small portable device. Device 10 may also be a set-top box, a desktop computer, a display into which a computer or other processing circuitry has been integrated, a display without an integrated computer, a wireless access point, a wireless base station, an electronic device incorporated into a kiosk, building, or vehicle, or other suitable electronic equipment.

Device 10 may include a housing such as housing 12. Housing 12, which may sometimes be referred to as a case, may be formed of plastic, glass, ceramics, fiber composites, metal (e.g., stainless steel, aluminum, etc.), other suitable materials, or a combination of these materials. In some situations, parts of housing 12 may be formed from dielectric or other low-conductivity material (e.g., glass, ceramic, plastic, sapphire, etc.). In other situations, housing 12 or at least some of the structures that make up housing 12 may be formed from metal elements.

Device 10 may, if desired, have a display such as display 14. Display 14 may be mounted on the front face of device 10. Display 14 may be a touch screen that incorporates capacitive touch electrodes or may be insensitive to touch. The rear face of housing 12 (i.e., the face of device 10 opposing the front face of device 10) may have a substantially planar housing wall such as rear housing wall 12R (e.g., a planar housing wall). Rear housing wall 12R may have slots that pass entirely through the rear housing wall and that therefore separate portions of housing 12 from each other. Rear housing wall 12R may include conductive portions and/or dielectric portions. If desired, rear housing wall 12R may include a planar metal layer covered by a thin layer or coating of dielectric such as glass, plastic, sapphire, or ceramic (e.g., a dielectric cover layer). Housing 12 may also have shallow grooves that do not pass entirely through housing 12. The slots and grooves may be filled with plastic or other dielectric materials. If desired, portions of housing 12 that have been separated from each other (e.g., by a through slot) may be joined by internal conductive structures (e.g., sheet metal or other metal members that bridge the slot).

Housing 12 may include peripheral housing structures such as peripheral structures 12W. Conductive portions of peripheral structures 12W and conductive portions of rear housing wall 12R may sometimes be referred to herein collectively as conductive structures of housing 12. Peripheral structures 12W may run around the periphery of device 10 and display 14. In configurations in which device 10 and display 14 have a rectangular shape with four edges, peripheral structures 12W may be implemented using peripheral housing structures that have a rectangular ring shape with four corresponding edges and that extend from rear housing wall 12R to the front face of device 10 (as an example). In other words, device 10 may have a length (e.g., measured parallel to the Y-axis), a width that is less than the length (e.g., measured parallel to the X-axis), and a height (e.g., measured parallel to the Z-axis) that is less than the width. Peripheral structures 12W or part of peripheral structures 12W may serve as a bezel for display 14 (e.g., a cosmetic trim that surrounds all four sides of display 14 and/or that helps hold display 14 to device 10) if desired. Peripheral structures 12W may, if desired, form sidewall structures for device 10 (e.g., by forming a metal band with vertical sidewalls, curved sidewalls, etc.).

Peripheral structures 12W may be formed from a conductive material such as metal and may therefore sometimes be referred to as peripheral conductive housing structures, conductive housing structures, peripheral metal structures, peripheral conductive sidewalls, peripheral conductive sidewall structures, conductive housing sidewalls, peripheral conductive housing sidewalls, sidewalls, sidewall structures, or a peripheral conductive housing member (as examples). Peripheral conductive housing structures 12W may be formed from a metal such as stainless steel, aluminum, alloys, or other suitable materials. One, two, or more than two separate structures may be used in forming peripheral conductive housing structures 12W.

It is not necessary for peripheral conductive housing structures 12W to have a uniform cross-section. For example, the top portion of peripheral conductive housing structures 12W may, if desired, have an inwardly protruding ledge that helps hold display 14 in place. The bottom portion of peripheral conductive housing structures 12W may also have an enlarged lip (e.g., in the plane of the rear surface of device 10). Peripheral conductive housing structures 12W may have substantially straight vertical sidewalls, may have sidewalls that are curved, or may have other suitable shapes. In some configurations (e.g., when peripheral conductive housing structures 12W serve as a bezel for display 14), peripheral conductive housing structures 12W may run around the lip of housing 12 (i.e., peripheral conductive housing structures 12W may cover only the edge of housing 12 that surrounds display 14 and not the rest of the sidewalls of housing 12).

Rear housing wall 12R may lie in a plane that is parallel to display 14. In configurations for device 10 in which some or all of rear housing wall 12R is formed from metal, it may be desirable to form parts of peripheral conductive housing structures 12W as integral portions of the housing structures forming rear housing wall 12R. For example, rear housing wall 12R of device 10 may include a planar metal structure and portions of peripheral conductive housing structures 12W on the sides of housing 12 may be formed as flat or curved vertically extending integral metal portions of the planar metal structure (e.g., housing structures 12R and 12W may be formed from a continuous piece of metal in a unibody configuration). Housing structures such as these may, if desired, be machined from a block of metal and/or may include multiple metal pieces that are assembled together to form housing 12. Rear housing wall 12R may have one or more, two or more, or three or more portions. Peripheral conductive housing structures 12W and/or conductive portions of rear housing wall 12R may form one or more exterior surfaces of device 10 (e.g., surfaces that are visible to a user of device 10) and/or may be implemented using internal structures that do not form exterior surfaces of device 10 (e.g., conductive housing structures that are not visible to a user of device 10 such as conductive structures that are covered with layers such as thin cosmetic layers, protective coatings, and/or other coating/cover layers that may include dielectric materials such as glass, ceramic, plastic, or other structures that form the exterior surfaces of device 10 and/or serve to hide peripheral conductive housing structures 12W and/or conductive portions of rear housing wall 12R from view of the user).

Display 14 may have an array of pixels that form an active area AA that displays images for a user of device 10. For example, active area AA may include an array of display pixels. The array of pixels may be formed from liquid crystal display (LCD) components, an array of electrophoretic pixels, an array of plasma display pixels, an array of organic light-emitting diode display pixels or other light-emitting diode pixels, an array of electrowetting display pixels, or display pixels based on other display technologies. If desired, active area AA may include touch sensors such as touch sensor capacitive electrodes, force sensors, or other sensors for gathering a user input.

Display 14 may have an inactive border region that runs along one or more of the edges of active area AA. Inactive area IA of display 14 may be free of pixels for displaying images and may overlap circuitry and other internal device structures in housing 12. To block these structures from view by a user of device 10, the underside of the display cover layer or other layers in display 14 that overlap inactive area IA may be coated with an opaque masking layer in inactive area IA. The opaque masking layer may have any suitable color. Inactive area IA may include a recessed region such as notch 24 that extends into active area AA. Active area AA may, for example, be defined by the lateral area of a display module for display 14 (e.g., a display module that includes pixel circuitry, touch sensor circuitry, etc.). The display module may have a recess or notch in upper region 20 of device 10 that is free from active display circuitry (i.e., that forms notch 24 of inactive area IA). Notch 24 may be a substantially rectangular region that is surrounded (defined) on three sides by active area AA and on a fourth side by peripheral conductive housing structures 12W. Alternatively, notch 24 may be defined on all sides by (e.g., may be surrounded and enclosed by) active area AA (e.g., notch 24 may form an inactive island in the pixel circuitry of display

14). One or more sensors may be aligned with notch 24 and may transmit and/or receive light through display 14 within notch 24.

Display 14 may be protected using a display cover layer such as a layer of transparent glass, clear plastic, transparent ceramic, sapphire, or other transparent crystalline material, or other transparent layer(s). The display cover layer may have a planar shape, a convex curved profile, a shape with planar and curved portions, a layout that includes a planar main area surrounded on one or more edges with a portion that is bent out of the plane of the planar main area, or other suitable shapes. The display cover layer may cover the entire front face of device 10. In another suitable arrangement, the display cover layer may cover substantially all of the front face of device 10 or only a portion of the front face of device 10. Openings may be formed in the display cover layer. For example, an opening may be formed in the display cover layer to accommodate a button. An opening may also be formed in the display cover layer to accommodate ports such as speaker port 16 in notch 24 or a microphone port. Openings may be formed in housing 12 to form communications ports (e.g., an audio jack port, a digital data port, etc.) and/or audio ports for audio components such as a speaker and/or a microphone if desired.

Display 14 may include conductive structures such as an array of capacitive electrodes for a touch sensor, conductive lines for addressing pixels, driver circuits, etc. Housing 12 may include internal conductive structures such as metal frame members and a planar conductive housing member (sometimes referred to as a conductive support plate or backplate) that spans the walls of housing 12 (e.g., a substantially rectangular sheet formed from one or more metal parts that is welded or otherwise connected between opposing sides of peripheral conductive housing structures 12W). The conductive support plate may form an exterior rear surface of device 10 or may be covered by a dielectric cover layer such as a thin cosmetic layer, protective coating, and/or other coatings that may include dielectric materials such as glass, ceramic, plastic, or other structures that form the exterior surfaces of device 10 and/or serve to hide the conductive support plate from view of the user (e.g., the conductive support plate may form part of rear housing wall 12R). Device 10 may also include conductive structures such as printed circuit boards, components mounted on printed circuit boards, and other internal conductive structures. These conductive structures, which may be used in forming a ground plane in device 10, may extend under active area AA of display 14, for example.

In regions 22 and 20, openings may be formed within the conductive structures of device 10 (e.g., between peripheral conductive housing structures 12W and opposing conductive ground structures such as conductive portions of rear housing wall 12R, conductive traces on a printed circuit board, conductive electrical components in display 14, etc.). These openings, which may sometimes be referred to as gaps, may be filled with air, plastic, and/or other dielectrics and may be used in forming slot antenna resonating elements for one or more antennas in device 10, if desired.

Conductive housing structures and other conductive structures in device 10 may serve as a ground plane for the antennas in device 10. The openings in regions 22 and 20 may serve as slots in open or closed slot antennas, may serve as a central dielectric region that is surrounded by a conductive path of materials in a loop antenna, may serve as a space that separates an antenna resonating element such as a strip antenna resonating element or an inverted-F antenna resonating element from the ground plane, may contribute to the performance of a parasitic antenna resonating element, or may otherwise serve as part of antenna structures formed in regions 22 and 20. If desired, the ground plane that is under active area AA of display 14 and/or other metal structures in device 10 may have portions that extend into parts of the ends of device 10 (e.g., the ground may extend towards the dielectric-filled openings in regions 22 and 20), thereby narrowing the slots in regions 22 and 20. Region 22 may sometimes be referred to herein as lower region 22 or lower end 22 of device 10. Region 20 may sometimes be referred to herein as upper region 20 or upper end 20 of device 10.

In general, device 10 may include any suitable number of antennas (e.g., one or more, two or more, three or more, four or more, etc.). The antennas in device 10 may be located at opposing first and second ends of an elongated device housing (e.g., at lower region 22 and/or upper region 20 of device 10 of FIG. 1), along one or more edges of a device housing, in the center of a device housing, in other suitable locations, or in one or more of these locations. The arrangement of FIG. 1 is illustrative and non-limiting.

Portions of peripheral conductive housing structures 12W may be provided with peripheral gap structures. For example, peripheral conductive housing structures 12W may be provided with one or more dielectric-filled gaps such as gaps 18, as shown in FIG. 1. The gaps in peripheral conductive housing structures 12W may be filled with dielectric such as polymer, ceramic, glass, air, other dielectric materials, or combinations of these materials. Gaps 18 may divide peripheral conductive housing structures 12W into one or more peripheral conductive segments. The conductive segments that are formed in this way may form parts of antennas in device 10 if desired. Other dielectric openings may be formed in peripheral conductive housing structures 12W (e.g., dielectric openings other than gaps 18) and may serve as dielectric antenna windows for antennas mounted within the interior of device 10. Antennas within device 10 may be aligned with the dielectric antenna windows for conveying radio-frequency signals through peripheral conductive housing structures 12W. Antennas within device 10 may also be aligned with inactive area IA of display 14 for conveying radio-frequency signals through display 14.

To provide an end user of device 10 with as large of a display as possible (e.g., to maximize an area of the device used for displaying media, running applications, etc.), it may be desirable to increase the amount of area at the front face of device 10 that is covered by active area AA of display 14. Increasing the size of active area AA may reduce the size of inactive area IA within device 10. This may reduce the area behind display 14 that is available for antennas within device 10. For example, active area AA of display 14 may include conductive structures that serve to block radio-frequency signals handled by antennas mounted behind active area AA from radiating through the front face of device 10. It would therefore be desirable to be able to provide antennas that occupy a small amount of space within device 10 (e.g., to allow for as large of a display active area AA as possible) while still allowing the antennas to communicate with wireless equipment external to device 10 with satisfactory efficiency bandwidth.

In a typical scenario, device 10 may have one or more upper antennas and one or more lower antennas. An upper antenna may, for example, be formed in upper region 20 of device 10. A lower antenna may, for example, be formed in lower region 22 of device 10. Additional antennas may be formed along the edges of housing 12 extending between regions 20 and 22 if desired. The antennas may be used separately to cover identical communications bands, overlapping communications bands, or separate communications bands. The antennas may be used to implement an antenna diversity scheme or a multiple-input-multiple-output (MIMO) antenna scheme. Other antennas for covering any other desired frequencies may also be mounted at any desired locations within the interior of device 10. The example of FIG. 1 is illustrative and non-limiting. If desired, housing 12 may have other shapes (e.g., a square shape, cylindrical shape, spherical shape, combinations of these and/or different shapes, etc.).

Figure 2:
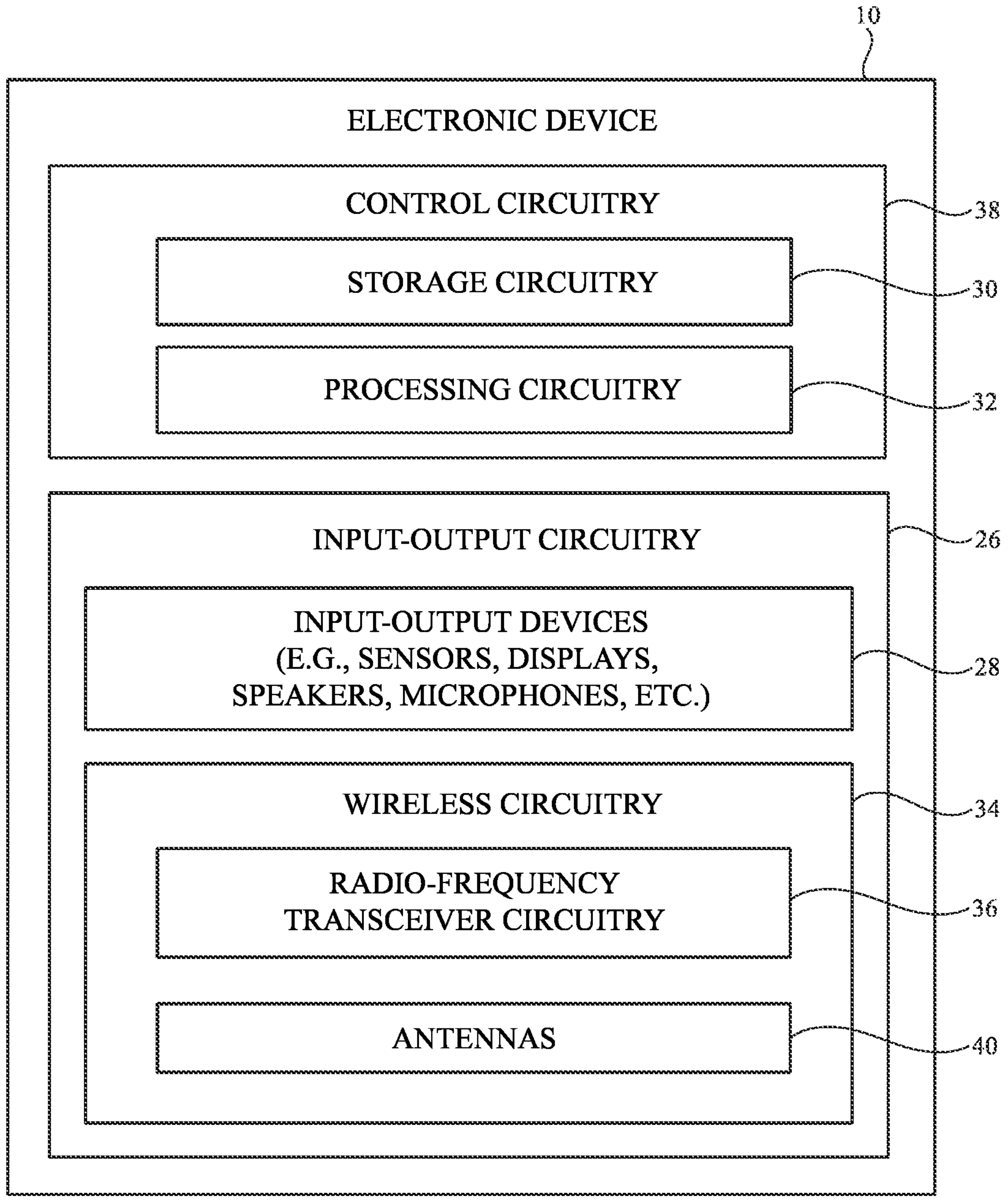
FIG. 2 is a schematic diagram of illustrative circuitry in an electronic device in accordance with some embodiments.

A schematic diagram of illustrative components that may be used in device 10 is shown in FIG. 2. As shown in FIG. 2, device 10 may include control circuitry 38. Control circuitry 38 may include storage such as storage circuitry 30. Storage circuitry 30 may include hard disk drive storage, nonvolatile memory (e.g., flash memory or other electrically-programmable-read-only memory configured to form a solid-state drive), volatile memory (e.g., static or dynamic random-access-memory), etc.

Control circuitry 38 may include processing circuitry such as processing circuitry 32. Processing circuitry 32 may be used to control the operation of device 10. Processing circuitry 32 may include one or more processors such as microprocessors, microcontrollers, digital signal processors, host processors, baseband processor integrated circuits, application specific integrated circuits, graphics processing units, central processing units (CPUs), etc. Control circuitry 38 may be configured to perform operations in device 10 using hardware (e.g., dedicated hardware or circuitry), firmware, and/or software. Software code for performing operations in device 10 may be stored on storage circuitry 30 (e.g., storage circuitry 30 may include non-transitory (tangible) computer readable storage media that stores the software code). The software code may sometimes be referred to as program instructions, software, data, instructions, or code. Software code stored on storage circuitry 30 may be executed by processing circuitry 32.

Control circuitry 38 may be used to run software on device 10 such as internet browsing applications, voice-over-internet-protocol (VOIP) telephone call applications, email applications, media playback applications, operating system functions, etc. To support interactions with external equipment, control circuitry 38 may be used in implementing communications protocols. Communications protocols that may be implemented using control circuitry 38 include internet protocols, wireless local area network protocols (e.g., IEEE 802.11 protocols-sometimes referred to as Wi-Fi®), protocols for other short-range wireless communications links such as the Bluetooth® protocol or other WPAN protocols, IEEE 802.11ad protocols, cellular telephone protocols, MIMO protocols, antenna diversity protocols, satellite navigation system protocols, antenna-based spatial ranging protocols (e.g., radio detection and ranging (RADAR) protocols or other desired range detection protocols for signals conveyed at millimeter and centimeter wave frequencies), etc. Each communication protocol may be associated with a corresponding radio access technology (RAT) that specifies the physical connection methodology used in implementing the protocol.

Device 10 may include input-output circuitry 26. Input-output circuitry 26 may include input-output devices 28. Input-output devices 28 may be used to allow data to be supplied to device 10 and to allow data to be provided from device 10 to external devices. Input-output devices 28 may include user interface devices, data port devices, sensors, and other input-output components. For example, input-output devices 28 may include touch screens, displays without touch sensor capabilities, buttons, joysticks, scrolling wheels, touch pads, key pads, keyboards, microphones, cameras, speakers, status indicators, light sources, audio jacks and other audio port components, digital data port devices, light sensors, gyroscopes, accelerometers or other components that can detect motion and device orientation relative to the Earth, capacitance sensors, proximity sensors (e.g., a capacitive proximity sensor and/or an infrared proximity sensor), magnetic sensors, and other sensors and input-output components. The sensors in input-output devices 28 may include front-facing sensors that gather sensor data through display 14. The front-facing sensors may be optical sensors. The optical sensors may include an image sensor (e.g., a front-facing camera), an infrared sensor, and/or an ambient light sensor. The infrared sensor may include one or more infrared emitters (e.g., a dot projector and a flood illuminator) and/or one or more infrared image sensors.

Input-output circuitry 26 may include wireless circuitry such as wireless circuitry 34 for wirelessly conveying radio-frequency signals. While control circuitry 38 is shown separately from wireless circuitry 34 in the example of FIG. 2 for the sake of clarity, wireless circuitry 34 may include processing circuitry that forms a part of processing circuitry 32 and/or storage circuitry that forms a part of storage circuitry 30 of control circuitry 38 (e.g., portions of control circuitry 38 may be implemented on wireless circuitry 34). As an example, control circuitry 38 may include baseband processor circuitry or other control components that form a part of wireless circuitry 34.

Wireless circuitry 34 may include radio-frequency (RF) transceiver circuitry formed from one or more integrated circuits, power amplifier circuitry, low-noise input amplifiers, passive RF components, one or more antennas, transmission lines, and other circuitry for handling RF wireless signals. Wireless signals can also be sent using light (e.g., using infrared communications).

Wireless circuitry 34 may include radio-frequency transceiver circuitry 36 for handling transmission and/or reception of radio-frequency signals within corresponding frequency bands at radio frequencies (sometimes referred to herein as communications bands or simply as "bands"). The frequency bands handled by radio-frequency transceiver circuitry 36 may include wireless local area network (WLAN) frequency bands (e.g., Wi-Fi® (IEEE 802.11) or other WLAN communications bands) such as a 2.4 GHz WLAN band (e.g., from 2400 to 2480 MHZ), a 5 GHZ WLAN band (e.g., from 5180 to 5825 MHZ), a Wi-Fi® 6E band (e.g., from 5925-7125 MHz), and/or other Wi-Fi® bands (e.g., from 1875-5160 MHZ), wireless personal area network (WPAN) frequency bands such as the 2.4 GHz Bluetooth® band or other WPAN communications bands, cellular telephone communications bands such as a cellular low band (LB) (e.g., 600 to 960 MHZ), a cellular low-midband (LMB) (e.g., 1400 to 1550 MHZ), a cellular midband (MB) (e.g., from 1700 to 2200 MHZ), a cellular high band (HB) (e.g., from 2300 to 2700 MHZ), a cellular ultra-high band (UHB) (e.g., from 3300 to 5000 MHz, or other cellular communications bands between about 600 MHz and about 5000 MHz), 3G bands, 4G LTE bands, 3GPP 5G New Radio Frequency Range 1 (FR1) bands below 10 GHZ, 3GPP 5G New Radio (NR) Frequency Range 2 (FR2) bands between 20 and 60 GHz, other centimeter or millimeter wave frequency bands between 10-300 GHz, near-field communications frequency bands (e.g., at 13.56 MHZ), satellite navigation frequency bands such as the Global Positioning System (GPS) L1 band (e.g., at 1575 MHz), L2 band (e.g., at 1228 MHZ), L3 band (e.g., at 1381 MH2), L4 band (e.g., at 1380 MHz), and/or L5 band (e.g., at 1176 MHZ), a Global Navigation Satellite System (GLONASS) band, a BeiDou Navigation Satellite System (BDS) band, ultra-wideband (UWB) frequency bands that operate under the IEEE 802.15.4 protocol and/or other ultra-wideband communications protocols (e.g., a first UWB communications band at 6.5 GHZ and/or a second UWB communications band at 8.0 GHZ), communications bands under the family of 3GPP wireless communications standards, communications bands under the IEEE 802.XX family of standards, satellite communications bands such as an L-band, S-band (e.g., from 2-4 GHZ), C-band (e.g., from 4-8 GHZ), X-band, Ku-band (e.g., from 12-18 GHZ), Ka-band (e.g., from 26-40 GHZ), etc., industrial, scientific, and medical (ISM) bands such as an ISM band between around 900 MHz and 950 MHz or other ISM bands below or above 1 GHZ, one or more unlicensed bands, one or more bands reserved for emergency and/or public services, and/or any other desired frequency bands of interest. Wireless circuitry 34 may also be used to perform spatial ranging operations if desired.

UWB communications handled by radio-frequency transceiver circuitry 36 may be based on an impulse radio signaling scheme that uses band-limited data pulses. Radio-frequency signals in the UWB frequency band may have any desired bandwidths such as bandwidths between 499 MHz and 1331 MHz, bandwidths greater than 500 MHZ, etc. The presence of lower frequencies in the baseband may sometimes allow ultra-wideband signals to penetrate through objects such as walls. In an IEEE 802.15.4 system, for example, a pair of electronic devices may exchange wireless time stamped messages. Time stamps in the messages may be analyzed to determine the time of flight of the messages and thereby determine the distance (range) between the devices and/or an angle between the devices (e.g., an angle of arrival of incoming radio-frequency signals).

Radio-frequency transceiver circuitry 36 may include respective transceivers (e.g., transceiver integrated circuits or chips) that handle each of these frequency bands or any desired number of transceivers that handle two or more of these frequency bands. In scenarios where different transceivers are coupled to the same antenna, filter circuitry (e.g., duplexer circuitry, diplexer circuitry, low pass filter circuitry, high pass filter circuitry, band pass filter circuitry, band stop filter circuitry, etc.), switching circuitry, multiplexing circuitry, or any other desired circuitry may be used to isolate radio-frequency signals conveyed by each transceiver over the same antenna (e.g., filtering circuitry or multiplexing circuitry may be interposed on a radio-frequency transmission line shared by the transceivers). Radio-frequency transceiver circuitry 36 may include one or more integrated circuits (chips), integrated circuit packages (e.g., multiple integrated circuits mounted on a common printed circuit in a system-in-package device, one or more integrated circuits mounted on different substrates, etc.), power amplifier circuitry, up-conversion circuitry, down-conversion circuitry, low-noise input amplifiers, passive radio-frequency components, switching circuitry, transmission line structures, and other circuitry for handling radio-frequency signals and/or for converting signals between radio-frequencies, intermediate frequencies, and/or baseband frequencies.

In general, radio-frequency transceiver circuitry 36 may cover (handle) any desired frequency bands of interest. As shown in FIG. 2, wireless circuitry 34 may include antennas 40. Radio-frequency transceiver circuitry 36 may convey radio-frequency signals using one or more antennas 40 (e.g., antennas 40 may convey the radio-frequency signals for the transceiver circuitry). The term "convey radio-frequency signals" as used herein means the transmission and/or reception of the radio-frequency signals (e.g., for performing unidirectional and/or bidirectional wireless communications with external wireless communications equipment). Antennas 40 may transmit the radio-frequency signals by radiating the radio-frequency signals into free space (or to freespace through intervening device structures such as a dielectric cover layer). Antennas 40 may additionally or alternatively receive the radio-frequency signals from free space (e.g., through intervening devices structures such as a dielectric cover layer). The transmission and reception of radio-frequency signals by antennas 40 each involve the excitation or resonance of antenna currents on an antenna resonating element in the antenna by the radio-frequency signals within the frequency band(s) of operation of the antenna.

Antennas 40 in wireless circuitry 34 may be formed using any suitable antenna structures. For example, antennas 40 may include antennas with resonating elements that are formed from stacked patch antenna structures, loop antenna structures, patch antenna structures, inverted-F antenna structures, slot antenna structures, planar inverted-F antenna structures, waveguide structures, monopole antenna structures, dipole antenna structures, helical antenna structures, Yagi (Yagi-Uda) antenna structures, hybrids of these designs, etc. If desired, antennas 40 may include antennas with dielectric resonating elements such as dielectric resonator antennas. If desired, one or more of antennas 40 may be cavity-backed antennas. Two or more antennas 40 may be arranged in a phased antenna array if desired (e.g., for conveying centimeter and/or millimeter wave signals within a signal beam formed in a desired beam pointing direction that may be steered/adjusted over time). Different types of antennas may be used for different bands and combinations of bands.

Figure 3:
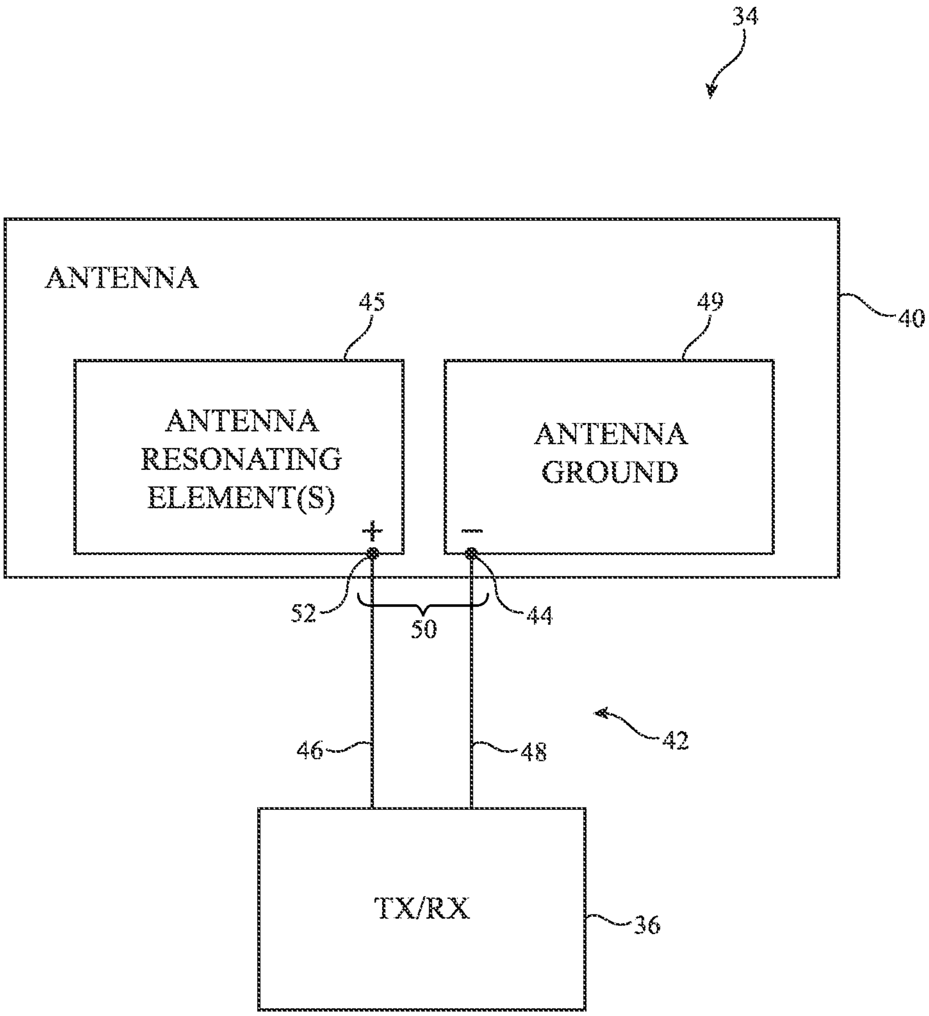
FIG. 3 is a schematic diagram of illustrative wireless circuitry in accordance with some embodiments.

FIG. 3 is a schematic diagram showing how a given antenna 40 may be fed by radio-frequency transceiver circuitry 36. As shown in FIG. 3, antenna 40 may have a corresponding antenna feed 50. Antenna 40 may include one or more antenna resonating (radiating) elements 45 and an antenna ground 49. Antenna resonating element(s) 45 may include one or more radiating arms, slots, waveguides, dielectric resonators, patches, parasitic elements, indirect feed elements, and/or any other desired antenna radiators. Antenna feed 50 may include a positive antenna feed terminal 52 coupled to at least one antenna resonating element 45 and a ground antenna feed terminal 44 coupled to antenna ground 49. If desired, one or more conductive paths (sometimes referred to herein as ground paths, short paths, or return paths) may couple antenna resonating element(s) 45 to antenna ground 49.

Radio-frequency transceiver (TX/RX) circuitry 36 may be coupled to antenna feed 50 using a radio-frequency transmission line path 42 (sometimes referred to herein as transmission line path 42). Transmission line path 42 may include a signal conductor such as signal conductor 46 (e.g., a positive signal conductor). Transmission line path 42 may include a ground conductor such as ground conductor 48. Ground conductor 48 may be coupled to ground antenna feed terminal 44 of antenna feed 50. Signal conductor 46 may be coupled to positive antenna feed terminal 52 of antenna feed 50.

Transmission line path 42 may include one or more radio-frequency transmission lines. The radio-frequency transmission line(s) in transmission line path 42 may include stripline transmission lines (sometimes referred to herein simply as striplines), coaxial cables, coaxial probes realized by metalized vias, microstrip transmission lines, edge-coupled microstrip transmission lines, edge-coupled stripline transmission lines, waveguide structures, combinations of these, etc. Multiple types of radio-frequency transmission line may be used to form transmission line path 42. Filter circuitry, switching circuitry, impedance matching circuitry, phase shifter circuitry, amplifier circuitry, and/or other circuitry may be interposed on transmission line path 42, if desired. One or more antenna tuning components for adjusting the frequency response of antenna 40 in one or more bands may be interposed on transmission line path 42 and/or may be integrated within antenna 40 (e.g., coupled between the antenna ground and the antenna resonating element of antenna 40, coupled between different portions of the antenna resonating element of antenna 40, etc.).

If desired, one or more of the radio-frequency transmission lines in transmission line path 42 may be integrated into ceramic substrates, rigid printed circuit boards, and/or flexible printed circuits. In one suitable arrangement, the radio-frequency transmission lines may be integrated within multilayer laminated structures (e.g., layers of a conductive material such as copper and a dielectric material such as a resin that are laminated together without intervening adhesive) that may be folded or bent in multiple dimensions (e.g., two or three dimensions) and that maintain a bent or folded shape after bending (e.g., the multilayer laminated structures may be folded into a particular three-dimensional shape to route around other device components and may be rigid enough to hold its shape after folding without being held in place by stiffeners or other structures). All the multiple layers of the laminated structures may be batch laminated together (e.g., in a single pressing process) without adhesive (e.g., as opposed to performing multiple pressing processes to laminate multiple layers together with adhesive).

Figure 4:
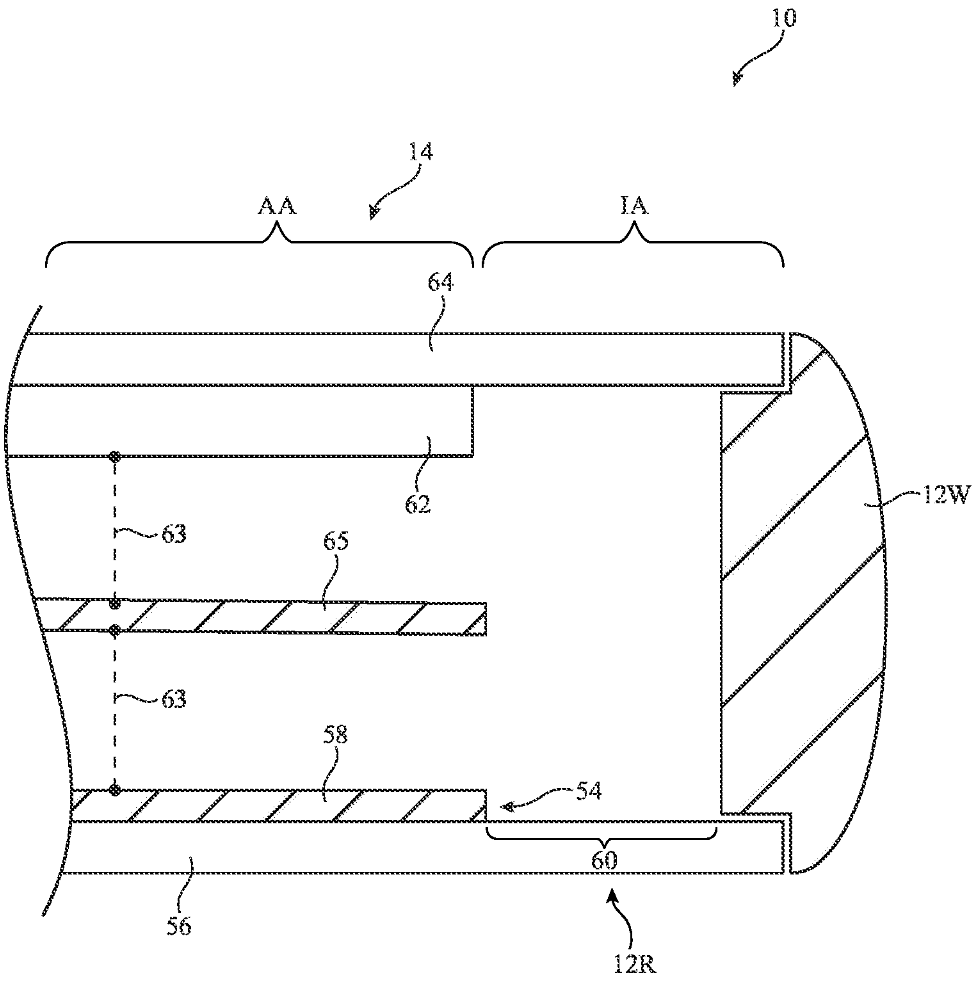
FIG. 4 is a cross-sectional side view of an electronic device having housing structures that may be used in forming antenna structures in accordance with some embodiments.

If desired, conductive electronic device structures such as conductive portions of housing 12 (FIG. 1) may be used to form at least part of one or more of the antennas 40 in device 10. FIG. 4 is a cross-sectional side view of device 10, showing illustrative conductive electronic device structures that may be used in forming one or more of the antennas 40 in device 10.

As shown in FIG. 4, peripheral conductive housing structures 12W may extend around the lateral periphery of device 10 (e.g., as measured in the X-Y plane of FIG. 1). Peripheral conductive housing structures 12W may extend from rear housing wall 12R (e.g., at the rear face of device 10) to display 14 (e.g., at the front face of device 10). In other words, peripheral conductive housing structures 12W may form conductive sidewalls for device 10, a first of which is shown in the cross-sectional side view of FIG. 4 (e.g., a given sidewall that runs along an edge of device 10 and that extends across the width or length of device 10).

Display 14 may have a display module such as display module 62 (sometimes referred to as a display panel). Display module 62 may include pixel circuitry, touch sensor circuitry, force sensor circuitry, and/or any other desired circuitry for forming active area AA of display 14. Display 14 may include a dielectric cover layer such as display cover layer 64 that overlaps display module 62. Display cover layer 64 may include plastic, glass, sapphire, ceramic, and/or any other desired dielectric materials. Display module 62 may emit image light and may receive sensor input (e.g., touch and/or force sensor input) through display cover layer 64. Display cover layer 64 and display 14 may be mounted to peripheral conductive housing structures 12W. The lateral area of display 14 that does not overlap display module 62 may form inactive area IA of display 14.

As shown in FIG. 4, rear housing wall 12R may be mounted to peripheral conductive housing structures 12W (e.g., opposite display 14). Rear housing wall 12R may include a dielectric cover layer such as dielectric cover layer 56. Dielectric cover layer 56 may include glass, plastic, sapphire, ceramic, one or more dielectric coatings, or other dielectric materials, and is sometimes also referred to herein as back glass (BG) 56. If desired, conductive material may be layered onto some of the interior lateral surface of dielectric cover layer 56. Dielectric cover layer 56 may extend across an entirety of the width of device 10 and/or an entirety of the length of device 10. If desired, dielectric cover layer 56 may be provided with pigmentation and/or an opaque masking layer (e.g., an ink layer) that helps to hide the interior of device 10 from view.

The housing for device 10 may also include one or more conductive support plates interposed between display 14 and rear housing wall 12R. For example, the housing for device 10 may include a first conductive support plate such as conductive support plate 58 and/or may include a second support plate such as conductive support plate 65. Conductive support plate 58 is vertically interposed between dielectric cover layer 56 and display module 62. Conductive support plate 65 is vertically interposed between conductive support plate 58 and display module 62. Conductive support plate 58 is sometimes also referred to herein as conductive lower chassis 58, lower chassis 58, conductive lower plate 58, lower plate 58, lower interior conductive housing wall 58, conductive layer 58, lower conductive layer 58, or lower conductive support plate 58. Conductive support plate 65 is sometimes also referred to herein as conductive mid-chassis 65, mid-chassis 65, conductive mid-plate 65, mid-plate 65, upper interior conductive housing wall 65, conductive layer 65, upper conductive layer 65, or upper conductive support plate 65.

Conductive support plate 58 may be layered onto dielectric cover layer 56 without adhesive that adheres conductive support plate 58 to dielectric cover layer 56 or may be separated from dielectric cover layer 56 by a non-zero distance (e.g., an air gap). This may, for example, allow dielectric cover layer 56 and/or rear housing wall 12R to be easily removed from device 10 (e.g., to repair and/or replace components within the interior of device 10). Alternatively, conductive support plate 58 may be adhered to dielectric cover layer 56 (e.g., may form a part of rear housing wall 12R). Alternatively, conductive support plate 58 may be omitted. Mid-chassis 65 may be located at a first distance from display 14 whereas conductive support plate 58 is located at a second distance that is greater than the first distance from display 14. If desired, mid-chassis 65 may be omitted from device 10.

Mid-chassis 65 and/or conductive support plate 58 may extend across an entirety of the width of device 10 (e.g., between the left and right edges of device 10 as shown in FIG. 1). Mid-chassis 65 may be formed from an integral portion of peripheral conductive housing structures 12W that extends across the width of device 10 or may include a separate housing structures attached, coupled, or affixed (e.g., welded) to peripheral conductive housing structures 12W. Conductive support plate 58 may, if desired, be formed from a separate conductor than peripheral conductive housing structures 12W (e.g., conductive support plate 58 and peripheral conductive housing structures 12W are not formed from an integral piece of metal) to help facilitate removal of rear housing wall 12R, for example. One or more components may be supported by mid-chassis 65 and/or conductive support plate 58 (e.g., logic boards such as a main logic board, a battery, etc.). Mid-chassis 65 and/or conductive support plate 58 may contribute to the mechanical strength of device 10 (e.g., to prevent external twisting or bending forces from damaging device 10). Mid-chassis 65 and/or conductive support plate 58 may be formed from metal (e.g., stainless steel, aluminum, titanium, etc.).

Conductive support plate 58, mid-chassis 65, and/or display module 62 may have an edge 54 that is separated from peripheral conductive housing structures 12W by dielectric-filled slot 60 (sometimes referred to herein as opening 60, gap 60, or aperture 60). Slot 60 may be filled with air, plastic, ceramic, or other dielectric materials. Conductive housing structures such as conductive support plate 58, mid-chassis 65, conductive portions of display module 62, and/or peripheral conductive housing structures 12W (e.g., the portion of peripheral conductive housing structures 12W opposite conductive support plate 58, mid-chassis 65, and display module 62 at slot 60) may be used to form antenna structures for one or more of the antennas 40 in device 10.

For example, peripheral conductive housing structures 12W may form an antenna resonating element arm (e.g., an inverted-F antenna resonating element arm) in the antenna resonating element 45 (FIG. 3) or may form a part of the antenna ground 49 (FIG. 3) of an antenna 40 in device 10. Mid-chassis 65, conductive support plate 58, and/or display module 62 may be used to form the antenna ground 49 (FIG. 3) for one or more of the antennas 40 in device 10 and/or to form one or more edges of slot antenna resonating elements for the antennas in device 10. One or more conductive interconnect structures 63 may electrically couple mid-chassis 65 to conductive support plate 58, one or more conductive interconnect structures 63 may electrically couple mid-chassis 65 to conductive structures in display module 62 (sometimes referred to herein as conductive display structures), and/or one or more conductive interconnect structures 63 may electrically couple conductive structures in display module 62 to conductive support plate 58 so that each of these elements form part of the antenna ground. The conductive structures in display module 62 may include a conductive frame, bracket, or support plate for display module 62, shielding layers in display module 62, ground traces in display module 62, pixel circuitry, etc.

Conductive interconnect structures 63 may serve to ground mid-chassis 65 to conductive support plate 58 and/or display module 62 (e.g., to ground conductive support plate 58 to the conductive display structures through mid-chassis 65) or may ground display module 62 directly to conductive support plate 58. Put differently, conductive interconnect structures 63 may hold the conductive structures in display module 62, mid-chassis 65, and/or conductive support plate 58 to a common ground or reference potential (e.g., as a system ground for device 10 that is used to form part of antenna ground 49 of FIG. 3). Conductive interconnect structures 63 may therefore sometimes be referred to herein as grounding structures 63, grounding interconnect structures 63, or vertical grounding structures 63. Conductive interconnect structures 63 may include conductive traces, conductive pins, conductive springs (e.g., y-springs or spring fingers), conductive prongs (e.g., conductive blades that mate with conductive spring fingers such as y-springs), conductive brackets, conductive screws, conductive clips, conductive tape, conductive wires, conductive traces, conductive foam, conductive adhesive, solder, welds, metal members (e.g., sheet metal members), contact pads, conductive vias, conductive portions of one or more components mounted to mid-chassis 65 and/or conductive support plate 58, and/or any other desired conductive interconnect structures.

Figure 5:
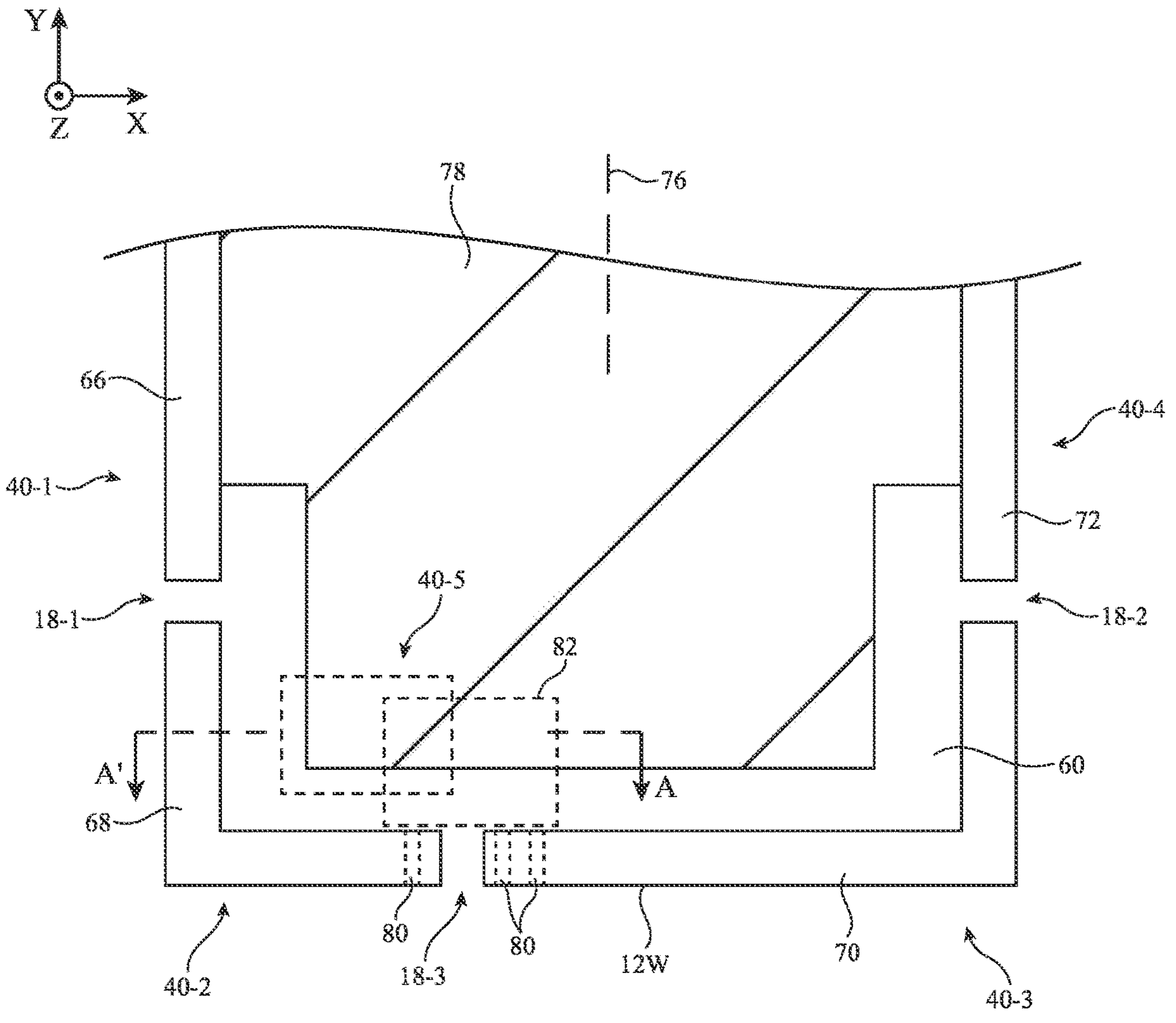
FIG. 5 is a top interior view of the lower end of an illustrative electronic device having an antenna overlapping a device component at a corner of the electronic device in accordance with some embodiments.

If desired, device 10 may include multiple slots 60 and peripheral conductive housing structures 12W may include multiple dielectric gaps that divide the peripheral conductive housing structures into segments (e.g., dielectric gaps 18 of FIG. 1). FIG. 5 is a top interior view showing how the lower end of device 10 (e.g., within region 22 of FIG. 1) may include a slot 60 and may include multiple dielectric gaps that divide the peripheral conductive housing structures into segments for forming multiple antennas. Display 14 and other internal components have been removed from the view shown in FIG. 5 for the sake of clarity.

As shown in FIG. 5, peripheral conductive housing structures 12W may include a first conductive sidewall at the left edge of device 10, a second conductive sidewall at the top edge of device 10 (not shown in FIG. 5), a third conductive sidewall at the right edge of device 10, and a fourth conductive sidewall at the bottom edge of device 10 (e.g., in an example where device 10 has a substantially rectangular lateral shape). Peripheral conductive housing structures 12W may be segmented by dielectric-filled gaps 18 such as a first gap 18-1, a second gap 18-2, and a third gap 18-3. Gaps 18-1, 18-2, and 18-3 may be filled with plastic, ceramic, sapphire, glass, epoxy, or other dielectric materials. The dielectric material in the gaps may lie flush with peripheral conductive housing structures 12W at the exterior surface of device 10 if desired.

Gap 18-1 may divide the first conductive sidewall to separate segment 66 of peripheral conductive housing structures 12W from segment 68 of peripheral conductive housing structures 12W. Gap 18-2 may divide the third conductive sidewall to separate segment 72 from segment 70 of peripheral conductive housing structures 12W. Gap 18-3 may divide the fourth conductive sidewall to separate segment 68 from segment 70 of peripheral conductive housing structures 12W. In this example, when viewed from the front face of device 10, segment 68 forms the bottom-left corner of device 10 (e.g., segment 68 may have a bend at the corner) and is formed from the first and fourth conductive sidewalls of peripheral conductive housing structures 12W (e.g., in lower region 22 of FIG. 1). Segment 70 forms the bottom-right corner of device 10 (e.g., segment 70 may have a bend at the corner) and is formed from the third and fourth conductive sidewalls of peripheral conductive housing structures 12W (e.g., in lower region 22 of FIG. 1).

Device 10 may include ground structures 78 (e.g., structures that form part of the antenna ground for one or more of the antennas in device 10). Ground structures 78 may include one or more metal layers such as conductive support plate 58 (FIG. 4), mid-chassis 65 (FIG. 4), conductive display structures, conductive interconnect structures 63 (FIG. 4), conductive traces on one or more printed circuit boards, conductive portions of one or more components in device 10, etc. Ground structures 78 may extend between opposing sidewalls of peripheral conductive housing structures 12W. For example, ground structures 78 may extend from segment 66 to segment 72 of peripheral conductive housing structures 12W (e.g., across the width of device 10, parallel to the X-axis of FIG. 5). Ground structures 78 may be welded or otherwise affixed to segments 66 and 72. In another implementation, some or all of ground structures 78, segment 66, and segment 72 may be formed from a single, integral (continuous) piece of machined metal (e.g., in a unibody configuration). Device 10 may have a longitudinal axis 76 that bisects the width of device 10 and that runs parallel to the length of device 10 (e.g., parallel to the Y-axis).

As shown in FIG. 5, slot 60 may separate ground structures 78 from segments 68 and 70 of peripheral conductive housing structures 12W (e.g., the upper edge of slot 60 may be defined by ground structures 78 whereas the lower edge of slot 60 is defined by segments 68 and 70). Slot 60 may have an elongated shape extending from a first end at gap 18-1 to an opposing second end at gap 18-2 (e.g., slot 60 may span the width of device 10). Slot 60 may be filled with air, plastic, glass, sapphire, epoxy, ceramic, or other dielectric material. Slot 60 may be continuous with gaps 18-1, 18-2, and 18-3 in peripheral conductive housing structures 12W if desired (e.g., a single piece of dielectric material may be used to fill both slot 60 and gaps 18-1, 18-2, and 18-3).

Ground structures 78, segment 66, segment 68, segment 70, and portions of slot 60 may be used in forming multiple antennas 40 in the lower region of device 10 (sometimes referred to herein as lower antennas). For example, device 10 may include a first antenna 40-1 having an antenna resonating (radiating) element formed from segment 66 and/or a portion of slot 60 (e.g., a vertically extending end of slot 60 that extends parallel to longitudinal axis 76 and past gap 18-1, between segment 66 and ground structures 78) and having an antenna ground formed from ground structures 78. Device 10 may also include a second antenna 40-2 having an antenna resonating element (e.g., a resonating element arm) formed from segment 68 and having an antenna ground formed from ground structures 78. Device 10 may also include a third antenna 40-3 having an antenna resonating element (e.g., a resonating element arm) formed from segment 70 and having an antenna ground formed from ground structures 78. Device 10 may also include a fourth antenna 40-4 having a slot antenna resonating element formed from segment 72 and/or a portion of slot 60 between segment 72 and ground structures 78. Antennas 40-2 and 40-3 may be, for example, inverted-F antennas having return paths that couples the respective resonating element arms to the antenna ground. Device 10 may include a fifth antenna 40-5 at least partially overlapping the volume of antenna 40-2. Fifth antenna 40-5 may include an antenna resonating element arm formed from conductive traces on an underlying substrate and may have an antenna ground formed from ground structures 78, segment 66, and/or segment 72. Antennas 40-1, 40-2, 40-3, 40-4, and 40-5 may convey radio-frequency signals in one or more frequency bands (e.g., using MIMO communications in one or more of bands, thereby maximizing data throughput).

Antenna 40-5 may coexist with and/or may overlap other device structures such as component 82. Component 82 may be aligned with one or more openings (holes) 80 in segment 70 and/or segment 68 of peripheral conductive housing structures 12W. In some implementations, component 82 may include a vent that passes air between an interior cavity of component 82 and/or the interior of device 10 and the exterior of device 10. As an example, the vent (sometimes also referred to herein as vent structures or a vent module) may include a microphone that receives sound (e.g., acoustic waves) through one or more of openings 80. Additionally or alternatively, the vent may include a barometric vent for device 10, in which one or more of openings 80 allows air to pass into and/or out of device 10 to equalize the internal air pressure of device 10 to the external air pressure around device 10 (e.g., to help optimize the mechanical integrity of device 10 under different air pressure conditions). In other implementations, component 82 may include a speaker. The speaker may include a speaker cavity or chamber (e.g., an acoustic chamber), a speaker driver, a speaker membrane, etc. The speaker may produce sound (e.g., acoustic waves) that are transmitted to the exterior of device 10 through one or more openings 80. Component 82 is sometimes also referred to herein as acoustic port module 82, acoustic component 82, vent 82, or speaker 82.

Component 82 may include dielectric structures such as a dielectric substrate. The dielectric substrate may include (e.g., may surround an enclose) one or more interior cavities such as an acoustic chamber, a speaker chamber, an acoustic chamber, a barometric chamber, a microphone chamber, a barometric port, an air cavity, etc. Component 82 may also include conductive structures such as a conductive cowling, bracket, or frame. The conductive cowling, bracket, or frame may be layered onto, attached to, affixed to, clipped to, and/or otherwise coupled to the dielectric substrate. The conductive cowling, bracket, or frame may help to attach component 82 to other device components such as a flexible or rigid printed circuit board, may help to ground one or more conductive structures in device 10 (e.g., may form part of the antenna ground for one or more antennas in device 10), may form an acoustic plate that modifies acoustic signals conveyed by component 82, and/or may help to maximize the mechanical strength or integrity of component 82 and/or device 10, as examples.

In general, it may be desirable to provide antenna 40-5 with a compact form factor to minimize space consumption in device 10 (e.g., to maximize the amount of space in device 10 available for other components). However, the bandwidth of antenna 40-5 is generally proportional to the area or volume of antenna 40-5. In addition, if care is not taken, conductive material in the vicinity of antenna 40-5 (e.g., the conductive cowling in component 82, segment 68, segment 66, ground structures 78, etc.) can further make it difficult for antenna 40-5 to exhibit sufficient bandwidth for covering a desired frequency range while conveying radio-frequency signals through the rear housing wall of device 10 (e.g., for covering all of a first frequency band B1 such as a 5G frequency band between around 5000 MHz and 6000 MHZ and/or all of a second frequency band B2 such as a Wi-Fi 6E frequency band between around 6000 MHz and 7200 MHz). Further, if care is not taken, the close proximity of antenna 40-2 (e.g., having an antenna resonating element arm formed from segment 68) to antenna 40-5 can cause excessive electromagnetic coupling between antenna 40-2 and antenna 40-5, which can undesirably interfere with (e.g., deteriorate the radiation pattern of) antenna 40-5 (or vice versa).

Figure 6:
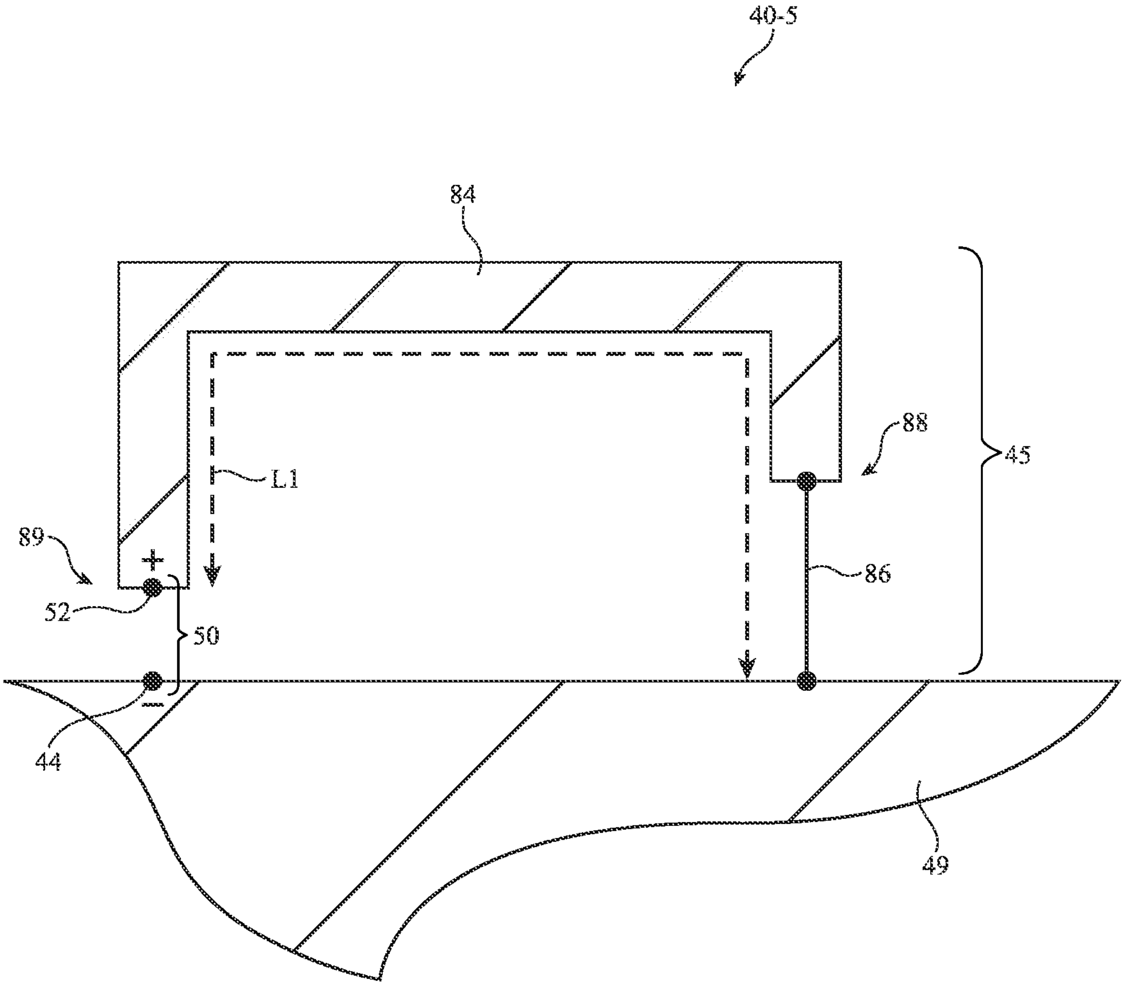
FIG. 6 is a schematic diagram of an illustrative antenna having a folded antenna element that is shorted to ground in accordance with some embodiments.

To help mitigate these issues, antenna 40-5 may include a folded antenna element that is shorted to ground and that is disposed on at least two sides of a dielectric substrate. FIG. 6 is a schematic diagram showing an example in which antenna 40-5 includes a folded antenna element that is shorted to ground. As shown in FIG. 6, the antenna resonating element 45 of antenna 40-5 may include an antenna element such as folded antenna element 84 (sometimes also referred to herein as antenna element 84, antenna arm 84, folded antenna arm 84, folded arm 84, arm 84, folded antenna radiator 84, antenna radiator 84, folded radiator 84, radiator 84, or folded element 84).

Folded antenna element 84 extends from a first (proximal) end 89 to an opposing second (distal) end 88. Positive antenna feed terminal 52 is coupled to folded antenna element 84 at first end 89 (e.g., folded antenna element 84 is a directly fed antenna element). First end 89 of folded antenna element 84 may be separated from antenna ground 49 by a dielectric-filled gap. Antenna feed 50 may be coupled across the gap (e.g., ground antenna feed terminal 44 may be coupled to antenna ground 49 opposite positive antenna feed terminal 52).

Second end 88 of folded antenna element 84 may be coupled (e.g., shorted) to antenna ground 49 by conductive interconnect structure 86. Conductive interconnect structure 86 may include a conductive pin, conductive spring (e.g., a y-spring or one or more spring fingers), conductive prong (e.g., conductive blades that mate with conductive spring fingers such as y-springs), conductive bracket, conductive screw, conductive clip, conductive tape, conductive wire, conductive foam, conductive adhesive, solder contact, weld, metal member (e.g., a sheet metal member), contact pad, conductive via, and/or any other desired conductive interconnect structures that electrically couple or short second end 88 of folded antenna element 84 to antenna ground 49.

Folded antenna element 84 may have a radiating (resonant) length L1 from positive antenna feed terminal 52 to ground through the length of folded antenna element 84 and conductive interconnect structure 86. Radiating length L1 may be selected to configure antenna 40-5 to convey radio-frequency signals (e.g., to resonate or radiate) at a desired frequency (e.g., a center frequency of a corresponding frequency band). Radiating length L1 may be, for example, approximately equal to (e.g., within 10-25% of) one-half the effective wavelength corresponding to the desired frequency, in a fundamental mode of antenna resonating element 45 (e.g., where effective wavelength is equal to the free space wavelength multiplied by a constant associated with the dielectric material around antenna resonating element 45). If desired, antenna resonating element 45 may have one or more harmonic modes that are utilized to convey radio-frequency signals.

When configured in this way, antenna resonating element 45 may form a folded shorted monopole antenna resonating element or a half loop antenna resonating element, for example. Folded antenna element 84 may sometimes also be referred to herein as folded and shorted monopole element 84 or half loop antenna element 84. The example of FIG. 6 is illustrative and non-limiting. In general, folded antenna element 84 may include any desired number of segments (e.g., curved and/or straight segments) extending at any desired angles between first end 89 and second end 88 and may have any desired number of straight and/or curved edges. If desired, antenna resonating element 45 may be provided with one or more parasitic elements (not shown) that are indirectly fed by folded antenna element 84 and that serve to widen the bandwidth of antenna 40-5.

Figure 7:
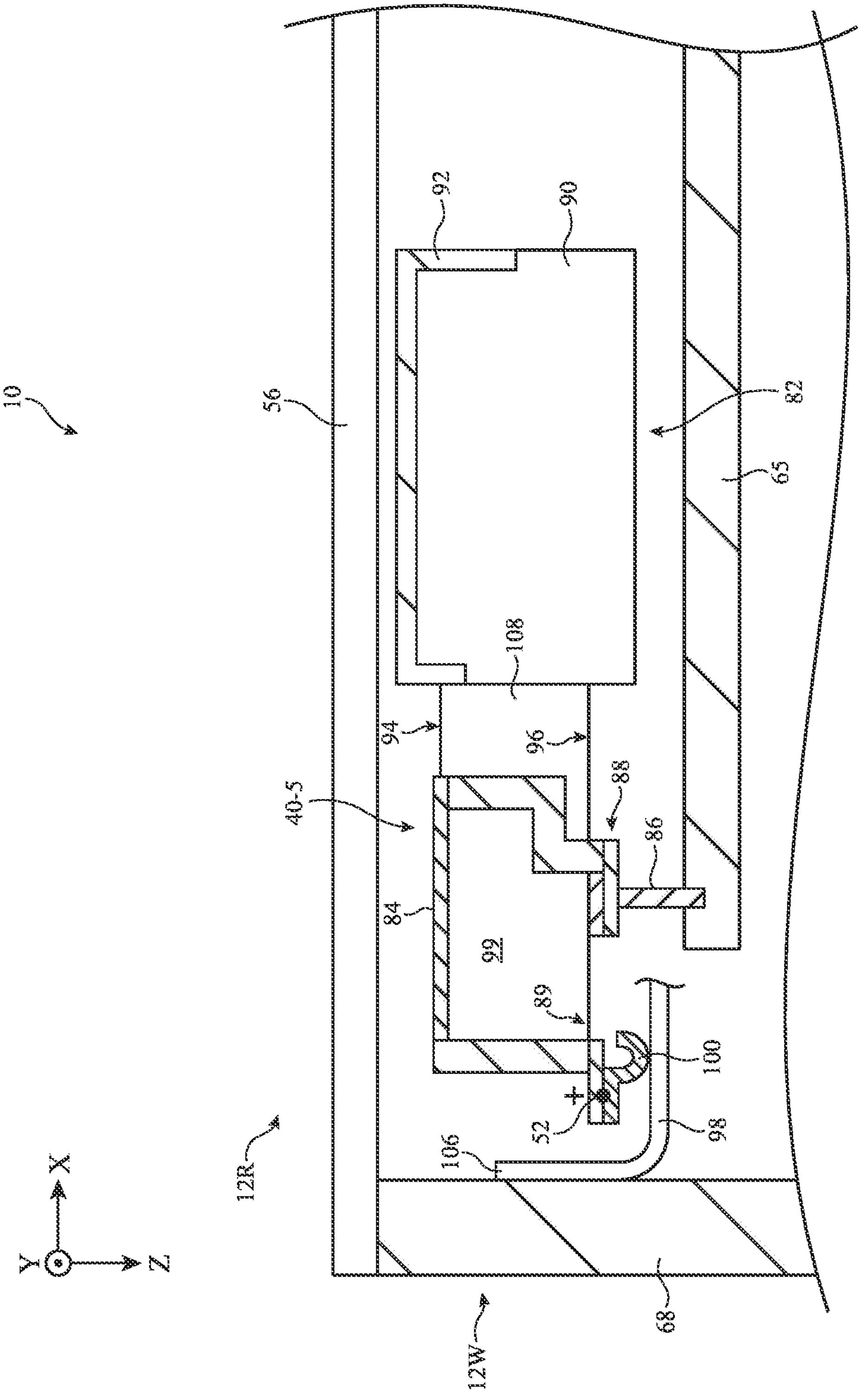
FIG. 7 is a cross-sectional side view of an illustrative electronic device having an antenna with a folded antenna element that is shorted to ground, where the folded antenna element is disposed on multiple sides of a dielectric substrate in accordance with some embodiments.

Folded antenna element 84 of antenna 40-5 may be disposed on at least two sides of a corresponding dielectric substrate in device 10. FIG. 7 is a cross-sectional side view (e.g., as taken along line AA' of FIG. 5, with rear housing wall 12R of device 10 facing upwards on the page) showing one example in which folded antenna element 84 is disposed on at least two sides of a corresponding dielectric substrate.

As shown in FIG. 7, component 82 may include a dielectric substrate such as dielectric substrate 90. Dielectric substrate 90 may be formed from plastic, ceramic, polymer, and/or other dielectric materials. Dielectric substrate 90 may include one or more interior cavities (not shown) such as an acoustic chamber, a microphone chamber, a speaker chamber, a barometric port, an acoustic chamber, an air cavity, etc. Component 82 may also include a conductive structure such a conductive cowling 92 (sometimes also referred to conductive bracket 92 or conductive frame 92). Conductive cowling 92 may be formed from conductive material such as stamped and/or folded sheet metal (e.g., aluminum, stainless steel, titanium, etc.). Conductive cowling 92 may be disposed on dielectric substrate 90. Conductive cowling 92 may, for example, be attached, affixed, clipped, adhered, and/or otherwise layered onto an exterior surface of dielectric substrate 90. If desired, some or all of conductive cowling 92 may be embedded (e.g., molded) within dielectric substrate 90. Conductive cowling 92 may extend across some or all of the lateral surface of dielectric substrate 90 facing rear housing wall 12R. If desired, conductive cowling 92 may include portions, tabs, prongs, arms, and/or retention members that extend down one or more sidewalls of dielectric substrate 90 and/or that help to secure conductive cowling 92 to dielectric substrate 90.

Device 10 may include a printed circuit board such as flexible printed circuit 98. Flexible printed circuit 98 may include signal traces that form the signal conductor(s) of the radio-frequency transmission line path(s) 42 (FIG. 3) for one or more antennas 40 in device 10 such as at least antenna 40-5 and optionally an antenna having an antenna resonating element formed from segment 68 of peripheral conductive housing structures 12W (e.g., antenna 40-2 of FIG. 5). Flexible printed circuit 98 may also include ground traces that form part of the antenna ground 49 (FIG. 3) for one or more antennas 40 in device 10 such as at least antenna 40-5. If desired, flexible printed circuit 98 may have a tail 106 that is folded towards rear housing wall 12R and that extends along segment 68 of peripheral conductive housing structures 12W. Tail 106 may be coupled, attached, affixed, and/or screwed to segment 68. A signal trace on tail 106 may be coupled to segment 68 (e.g., at the positive antenna feed terminal for antenna 40-2 of FIG. 5) and/or a ground trace on tail 106 may be coupled to segment 68 (e.g., to form a short circuit or return path for antenna 40-2 of FIG. 5).

As shown in FIG. 7, antenna 40-5 may have a folded antenna element 84 disposed between component 82, segment 68, and/or rear housing wall 12R. Folded antenna element 84 may, for example, be formed from one or more stamped and/or folded sheet metal members (e.g., pieces of sheet metal) that are disposed on and/or within a dielectric support structure such as substrate 98. In other implementations, some or all of folded antenna element 84 may be formed from conductive traces patterned onto substrate 108. Substrate 108 is sometimes also referred to herein as dielectric support structure 108, dielectric substrate 108, dielectric antenna carrier 108, or antenna carrier 108. Substrate 108 may be formed from plastic, polymer, ceramic, or other dielectric materials. Substrate 108 may be a different substrate than the dielectric substrate 90 of component 82 or may, if desired, be formed from an extension of dielectric substrate 90 (e.g., substrate 108 and dielectric substrate 90 may be different portions of a single integral dielectric substrate). Substrate 108 and/or dielectric substrate 90 may both be mounted to flexible printed circuit 98, may both be mounted to another printed circuit board such as a dock flex, or may be mounted to different rigid and/or flexible printed circuits.

Substrate 108 may have multiple surfaces such as first lateral surface 94, vertical surface 99, and a second lateral surface 96. Lateral surface 94 faces rear housing wall 12R. Lateral surface 96 opposes lateral surface 94 and faces away from rear housing wall 12R. Some or all of lateral surface 96 may be parallel to lateral surface 94 if desired. Vertical surface 99 may extend, from lateral surface 94, away from rear housing wall 12R towards lateral surface 96 (e.g., at an orthogonal angle with respect to lateral surface 94 and/or lateral surface 96). Vertical surface 99 may, for example, extend from lateral surface 94 to lateral surface 96. Vertical surface 99 is sometimes also referred to herein as side surface 99, sidewall 99, or upper surface 99 of substrate 108 (e.g., because vertical surface 99 faces the upper end of device 10). Substrate 108 may, for example, be laterally interposed between its vertical surface 99 and the bottom edge of device 10. Lateral surface 94 is sometimes also referred to herein as bottom surface 94 or rear surface 94 of substrate 108 (e.g., because lateral surface 94 faces the rear face of device 10). Lateral surface 96 is sometimes also referred to herein as top surface 96 or front surface 96 of substrate 108 (e.g., because lateral surface 96 faces the front face of device 10).

At least some (e.g., one or more horizontal segments) of folded antenna element 84 may be disposed on lateral surface 94 of substrate 108. At least some (e.g., one or more vertical segments) of folded antenna element 84 may be disposed on vertical surface 99 of substrate 108. At least some (e.g., one or more horizontal segments) of folded antenna element 84 may be disposed on lateral surface 96 of substrate 108. Put differently, folded antenna element 84 may be disposed on at least two or three sides or surfaces of substrate 108. If desired, a portion of substrate 108 may be molded over some or all of folded antenna element 84 (e.g., some or all of folded antenna element 84 may be molded or embedded within substrate 108 or an additional encapsulation disposed over folded antenna element 84 and substrate 108).

As shown in FIG. 7, folded antenna element 84 may extend from first end 89 at lateral surface 96 to second end 88 at lateral surface 96 of substrate 108. Folded antenna element 84 may include one or more segments that extend, from first end 89 (lateral surface 96), along vertical surface 99 to lateral surface 94 of substrate 108. Folded antenna element 84 may also include one or more segments that extend, from second end 88 (lateral surface 96), along vertical surface 99 to lateral surface 94 of substrate 108. Folded antenna element 84 may include one or more segments on lateral surface 94 that couple two segments on vertical surface 99 together.

Second end 88 of folded antenna element 84 may be coupled to mid-chassis 65 by conductive interconnect structure 86 (illustrated as a conductive screw in the example of FIG. 7). Conductive interconnect structure 86 may help to mechanically couple, attach, affix, or secure dielectric substrate 108 and/or folded antenna element 84 to mid-chassis 65. Conductive interconnect structure 86 may also electrically couple or short second end 88 of folded antenna element 84 to ground (e.g., to mid-chassis 65, which is held at a ground potential).

A conductive interconnect structure 100 (e.g., a conductive spring finger) may be coupled to the first end 89 of folded antenna element 84 at positive antenna feed terminal 52 (e.g., at or along lateral surface 96 of substrate 108). Conductive interconnect structure 100 may couple positive antenna feed terminal 52 and first end 89 of folded antenna element 84 to a signal trace on flexible printed circuit 98 that forms part of the radio-frequency transmission line path 42 (FIG. 3) used to feed antenna 40-5 (e.g., at a corresponding contact pad on flexible printed circuit 98). In this way, folded antenna element 84 may form a half-loop current path of length L1 (FIG. 6) between positive antenna feed terminal 52 and ground (e.g., mid-chassis 65).

Figure 8:
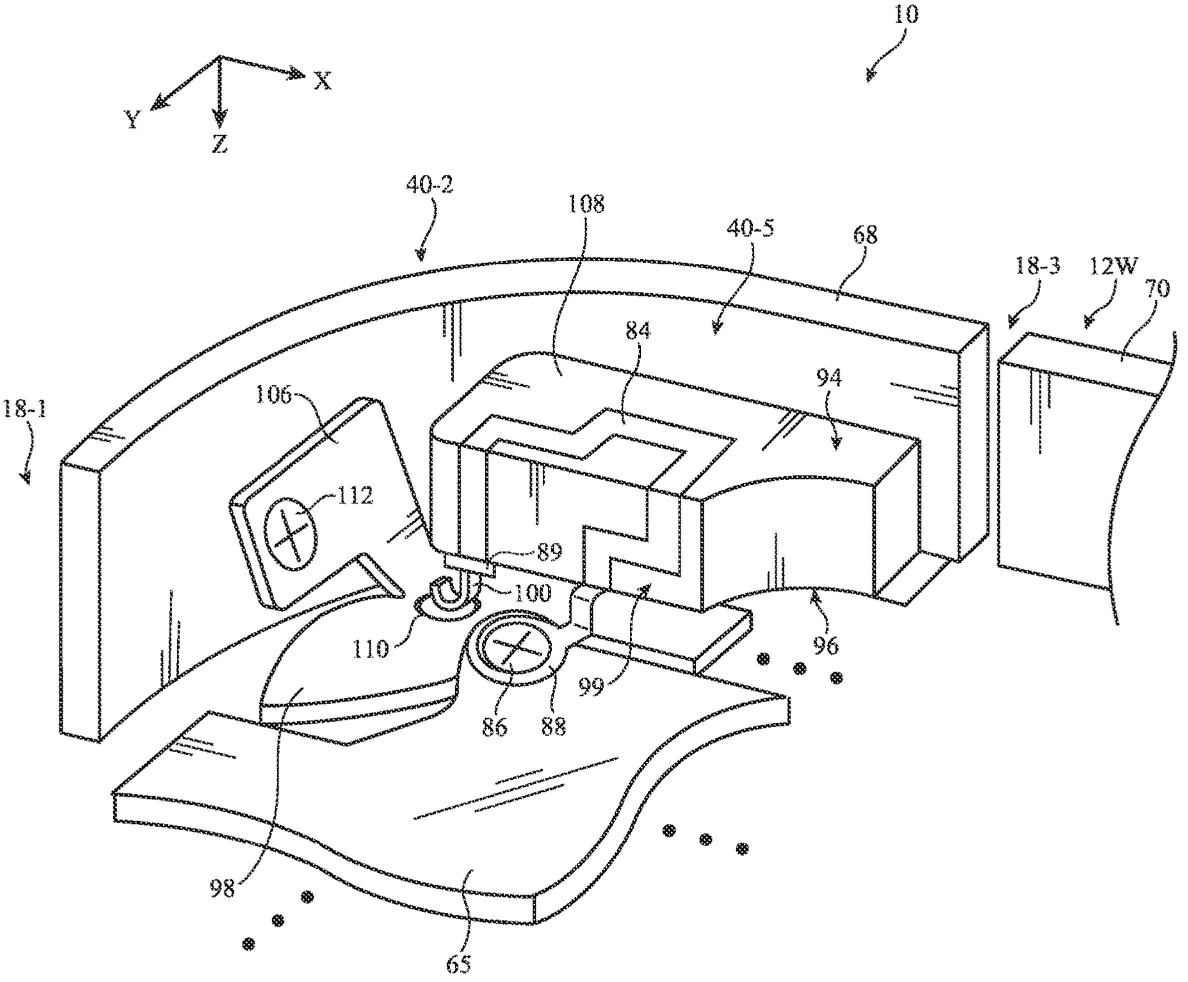
FIG. 8 is a rear perspective interior view of a corner of an illustrative electronic device provided with an antenna of the type shown in FIGS. 6 and 7 in accordance with some embodiments.

FIG. 8 is a rear perspective interior view of antenna 40-5 as disposed on substrate 108 of FIG. 7. In the example of FIG. 8, rear housing wall 12R and component 82 of FIG. 7 have been omitted for the sake of clarity.

As shown in FIG. 8, flexible printed circuit 98 and/or mid-chassis 65 may overlap at least some of substrate 108 (e.g., when viewed in the +Z direction). Substrate 108 may, if desired, be mounted to flexible printed circuit 98 and/or mid-chassis 65. Tail 106 of flexible printed circuit 98 may be folded towards the rear of device 10 along segment 68 of peripheral conductive housing structures 12W. If desired, conductive interconnect structure 112 (e.g., a conductive screw or other conductive interconnect structure) may couple tail 106 to segment 68.

Conductive interconnect structure 112 may mechanically attach flexible printed circuit 98 to segment 68. If desired, conductive interconnect structure 112 may couple a signal trace of a radio-frequency transmission line path on flexible printed circuit 98 to segment 68 (e.g., at a positive antenna feed terminal of antenna 40-2, which has an antenna resonating element arm formed from segment 68 and/or a slot antenna resonating element having at least one edge defined by segment 68). As another example, conductive interconnect structure 112 may couple a ground trace on flexible printed circuit 98 to segment 68 (e.g., to form a return path to ground for antenna 40-2).

Substrate 108 may be disposed at the corner of device 10. Substrate 108 may at least partially overlap gap 18-3 between segment 70 and segment 68 of peripheral conductive housing structures 12W or may be non-overlapping with respect to gap 18-3. First end 89 of folded antenna element 84 may be disposed at and/or on lateral surface 96 of substrate 108. Conductive interconnect structure 110 may couple first end 89 of folded antenna element 84 to contact pad 110 on flexible printed circuit 68. Contact pad 110 may be coupled to a signal trace on flexible printed circuit 98 that forms the signal conductor of the radio-frequency transmission line path 42 (FIG. 3) for antenna 40-5.

Folded antenna element 84 may extend from first end 89 along vertical surface 99 to lateral surface 94 of substrate 108. Folded antenna element 84 may extend along lateral surface 94 and back down vertical surface 99 to second end 88 at and/or on lateral surface 96 of substrate 108. Conductive interconnect structure 86 may couple second end 88 of folded antenna element 84 to mid-chassis 65, forming a half loop current path between conductive interconnect structure 100 and mid-chassis 65. The example of FIG. 8 is illustrative and non-limiting and, in general, folded antenna element 84 may follow any desired path having any desired number of curved and/or straight segments extending at any desired angles between ends 89 and 88 and may have any desired number of curved and/or straight edges.

Figure 9:
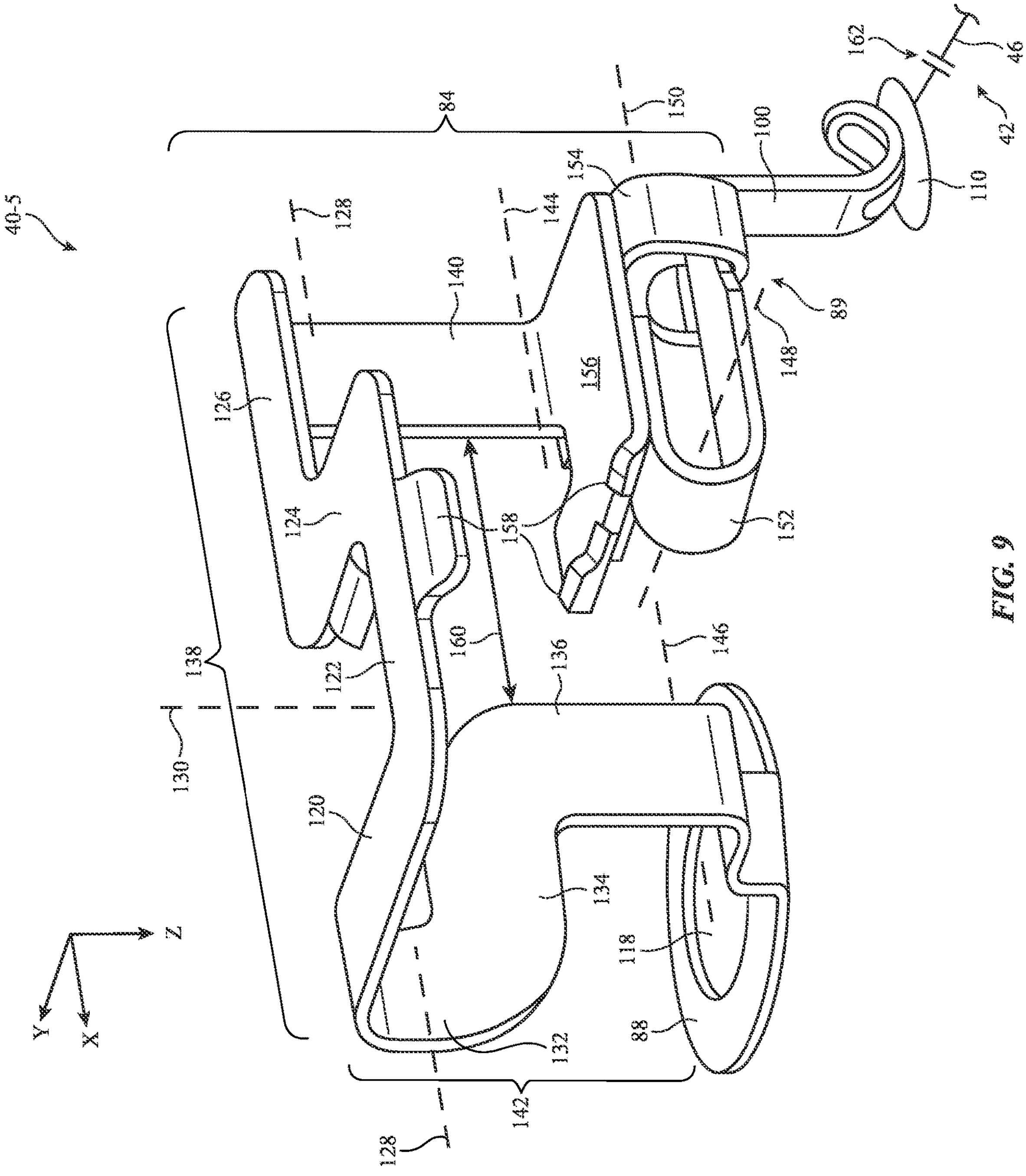
FIG. 9 is a rear perspective view of an illustrative antenna of the type shown in FIGS. 6-8 in accordance with some embodiments.

FIG. 9 is a rear perspective view of antenna 40-5. In the example of FIG. 9, substrate 108, peripheral conductive housing structures 12W, flexible printed circuit 98, conductive interconnect structure 86, and mid-chassis 65 have been omitted for the sake of clarity.

As shown in FIG. 9, folded antenna element 84 may include a vertical portion 142, a horizontal (lateral) portion 138, a vertical segment 140, a base portion 156, and folded transition portions such as transition portions 152 and 154. Vertical portion 142 may extend from second end 88 to a first end of horizontal portion 138 (e.g., along vertical surface 99 of substrate 108 as shown in FIG. 8). Horizontal portion 138 may extend from vertical portion 142 to vertical segment 140 (e.g., along lateral surface 94 of substrate 108 as shown in FIG. 8). Horizontal portion 138 may have a second end opposite its first end. The second end of horizontal portion 138 may be coupled to vertical segment 140. Vertical segment 140 may extend from the second end of horizontal portion 138 to base portion 156 (e.g., along vertical surface 99 of substrate 108 as shown in FIG. 8). Base portion 156 may extend along lateral surface 96 of substrate 108 (FIG. 8).

Transition portions 152 and 154 may couple base portion 156 to conductive interconnect structure 100 (e.g., at first end 89 of folded antenna element 84). Conductive interconnect structure 100 may couple base portion 156 and transition portions 152 and 154 to contact pad 110 (e.g., on flexible printed circuit 98 of FIG. 8). Contact pad 110 may be coupled to the signal conductor 46 of the radio-frequency transmission line path 42 for antenna 40-5 (e.g., on flexible printed circuit 98 of FIG. 8). If desired, one or more fixed or adjustable capacitors such as capacitor 162 (e.g., a surface mount technology (SMT) capacitor or a distributed capacitor) may be coupled in series along signal conductor 46 (e.g., for tuning the performance of antenna 40-5). Impedance matching circuitry and/or other tuning components (not shown) may also be used to tune the performance of antenna 40-5.

Second end 88 of folded antenna element 84 may lie within a first plane (e.g., parallel to the X-Y plane). Second end 88 may include an opening 118 that receives conductive interconnect structure 86 (FIG. 8). Second end 88 may be shorted to mid-chassis 65 (FIG. 8). Vertical portion 142 may be folded upwards and away from second end 88 about axis 146 (e.g., parallel to the X-axis). Vertical portion 142 may lie within a second plane (e.g., a plane orthogonal to the first plane such as a plane parallel to the X-Z plane). Vertical portion 142 may extend at a perpendicular angle or another angle with respect to second end 88. If desired, folded antenna element 84 may include two or more folds or bends between second end 88 and vertical portion 142.

Vertical portion 142 may include one or more segments that extend along vertical surface 99 of substrate 108 (FIG. 8). For example, as shown in FIG. 9, vertical portion 142 may include at least a first segment 136, a second segment 134, and a third segment 132. Segment 136 may extend from second end 88 to a first end of segment 134. Segment 132 may extend from a second end of segment 134 to the first end of horizontal portion 138.

Segment 136 may extend along a first longitudinal axis (e.g., parallel to the Z-axis). Segment 134 may extend along a second longitudinal axis non-parallel (e.g., perpendicular) to the first longitudinal axis (e.g., may extend parallel to the X-axis). Segment 132 may extend along a third longitudinal axis non-parallel (e.g., perpendicular) to the second longitudinal axis (e.g., parallel to the first longitudinal axis and/or the Z-axis). In this way, vertical portion 142 may follow a meandering path between second end 88 and horizontal portion 138, helping to increase the radiating length L1 of folded antenna element 84 (FIG. 6) given the volume occupied by antenna 40-5 in device 10 (e.g., for tuning the frequency response of antenna 40-5). This is illustrative and, if desired, vertical portion 142 may include only a single vertical segment, only two segments, or more than three segments, the segments may extend at any desired angles from each other, the segments may follow linear or curved paths, and/or the segments may have any desired number of curved and/or straight edges.

Horizontal portion 138 of folded antenna element 84 may lie within a third plane (e.g., parallel to the first plane and/or orthogonal to the second plane). The third plane may, for example, be parallel to the X-Y plane. Horizontal portion 138 may be folded downwards away from segment 132 of vertical portion 142 about axis 128. Axis 128 may, if desired be parallel to axis 146 (e.g., parallel to the X-axis). Horizontal portion 138 may extend at a perpendicular angle or another angle with respect to vertical portion 142. If desired, folded antenna element 84 may include two or more folds or bends between segment 132 and horizontal portion 138.

Horizontal portion 138 may include one or more segments that extend along lateral surface 94 of substrate 108 (FIG. 8). For example, as shown in FIG. 9, horizontal portion 138 may include at least a fourth segment 120, a fifth segment 122, a sixth segment 124, and a seventh segment 126. Horizontal portion 138 (e.g., segments 120-124) may, if desired, wind, wrap, or meander around a vertical axis 130 (e.g., parallel to the Z-axis and/or orthogonal to axis 128 and/or axis 146). In other words, horizontal portion 138 may follow a meandering path (e.g., non-linear) around vertical axis 130 from vertical segment 140 to vertical portion 142. This may serve to increase the radiating length L1 of folded antenna element 84 (FIG. 6) given the volume occupied by antenna 40-5 in device 10 and/or may help to perform impedance matching for antenna 40-5.

Segment 120 may extend from segment 132 to a first end of segment 122 (e.g., segment 120 may be folded about axis 128 relative to segment 132). Segment 122 may extend from its first end to an opposing second end that is coupled to segment 124. Segment 124 may have a first end coupled to the second end of segment 122 and may have a second end opposite the first end. Segment 126 may have a first end coupled to the second end of segment 124. Segment 126 may have an opposing second end coupled to vertical segment 140. In this way, segment 120 may couple segment 132 to segment 122, segment 122 may couple segment 120 to segment 124, segment 124 may couple segment 122 to segment 126, and segment 126 may couple segment 124 to vertical segment 140.

Segment 120 may extend along a fourth longitudinal axis (e.g., parallel to the Y-axis). Segment 122 may extend along a fifth longitudinal axis non-parallel (e.g., perpendicular) to the fourth longitudinal axis (e.g., parallel to the X-axis). Segment 124 may extend along a sixth longitudinal axis non-parallel (e.g., perpendicular) to the fifth longitudinal axis (e.g., parallel to the fourth longitudinal axis and/or the Y-axis). Segment 126 may extend along a seventh longitudinal axis non-parallel (e.g., perpendicular) to the sixth longitudinal axis (e.g., parallel to the fifth longitudinal axis and/or the X-axis). This is illustrative and, if desired, horizontal portion 138 may include only a single horizontal segment, only two segments, only three segments, or more than four segments, the segments may extend at any desired angles from each other, the segments may follow linear or curved paths, and/or the segments may have any desired number of curved and/or straight edges.

Vertical segment 140 may extend from the second end of segment 126. Vertical segment 140 may be folded downwards about axis 128 with respect to segment 126 (or about another axis parallel to axis 128 or non-parallel to axis 128). Vertical segment 140 may have a first end coupled to segment 126 and may have an opposing second end coupled to base portion 156 of folded antenna element 86. Vertical segment 140 may be laterally separated from vertical portion 142 of folded antenna element 84 by distance 160. Segment 140 and vertical portion 142 may lie within the same plane (e.g., parallel to the X-Z plane) or may lie in separate planes (e.g., two different planes that are parallel to the X-Z plane).

Distance 160 may be selected to prevent antenna current on different portions of folded antenna element 84 from being 180 degrees out of phase with each other and/or from canceling each other out (e.g., within horizontal portion 138) in a manner that would otherwise deteriorate the radiation pattern of antenna 40-5 at boresight (e.g., in the −Z direction through the rear housing wall of device 10). The example of FIG. 9 is illustrative and, if desired, folded antenna element 84 may include more than one vertical segment 140 that couples segment 126 to base portion 156 (e.g., vertical segment 140 may be replaced with multiple segments that lie in the same plane parallel to the X-Z plane and that follow a meandering path between segment 126 and base portion 156, similar to segments 132-136 of vertical portion 142).

Base portion 156 may be folded upwards about axis 144 with respect to vertical segment 140. Axis 144 may be parallel to the X-axis, parallel to axis 146, and/or parallel to axis 128 if desired. In some implementations, axis 144 may be colinear with respect to axis 146. Transition portions 152 and 154 may extend from base portion 156 to conductive interconnect structure 100. Transition portion 152 may, for example, be a U-shaped segment of folded antenna element 84 that extends from base portion 156 and that is wrapped, folded, or bent around axis 148. Axis 148 may be parallel to the Y-axis, orthogonal to axis 146, orthogonal to axis 144, and/or orthogonal to axis 128, for example. Transition portion 154 may extend from base portion 156 orthogonal to transition portion 152. Transition portion 152 may, for example, be a U-shaped segment of folded antenna element 84 that extends from base portion 156 and that is wrapped, folded, or bent around axis 150. Axis 150 may be parallel to the X-axis, orthogonal to axis 148, parallel to axis 144, parallel to axis 146, and/or parallel to axis 128, for example.

Transition portion 152 may, for example, help to establish a desired downward spring force exerted by conductive interconnect structure 100 on contact pad 110 (e.g., ensuring a reliable electrical connection between folded antenna element 84 and contact pad 110). Transition portion 154 may help to hold transition portion 152 and conductive interconnect structure 100 in place and/or may help to increase the reliability of the mechanical and/or electrical connection between base portion 156 and conductive interconnect structure 100.

If desired, folded antenna element 84 may include one or more retention members 158 on vertical portion 142, horizontal portion 138, vertical segment 140, and/or base portion 156. Retention members 158 may help to secure, affix, or attach folded antenna element 84 to substrate 108 (FIG. 8). Retention members 158 may include angled prongs, fingers, tabs, or other engagement structures, as examples.

If desired, second end 88, vertical portion 142, horizontal portion 138, vertical segment 140, base portion 156, transition portion 152, transition portion 154, and/or conductive interconnect structure 100 may be formed from one or more pieces of bent, folded, and/or stamped sheet metal. As one example, in the implementation shown in FIG. 9, second end 88, vertical portion 142, horizontal portion 138, vertical segment 140, and base portion 156 may be formed from different respective portions of a first piece of sheet metal, transition portion 152 and conductive interconnect structure 100 may be formed from different respective portions of a second piece of sheet metal (e.g., soldered or welded to the first piece of sheet metal at base portion 156), and transition portion 154 may be formed from a third piece of sheet metal (e.g., soldered or welded to the first piece of sheet metal at base portion 156). This is illustrative and non-limiting. If desired, some or all of second end 88, vertical portion 142, horizontal portion 138, vertical segment 140, base portion 156, transition portion 152, and/or transition portion 154 may be formed from different respective pieces of sheet metal and/or conductive traces patterned onto substrate 108 (FIG. 8).

When arranged in this way, folded antenna element 84 may exhibit greater peak antenna current magnitudes (e.g., a maximum current amplitude level) along its vertical portions (e.g., along vertical portion 142 and vertical segment 140), at second end 88, and at its positive antenna feed terminal (e.g., at base portion 156 and/or transition portions 152 and 154). On the other hand, folded antenna element 84 may exhibit lesser peak antenna current magnitudes (e.g., a minimum current amplitude level) along horizontal portion 138 (e.g., within segments 120-126). Configuring the antenna to exhibit minimum peak current magnitude levels along horizontal portion 138 may serve to minimize the amount of electromagnetic coupling between folded antenna element 84 and segment 68 of peripheral conductive housing structures 12W (FIG. 8), which helps to prevent deterioration in the radiation pattern of antenna 40-5 through rear housing wall 12R (FIG. 8) due to the presence of antenna 40-2 in close proximity to antenna 40-5. In other words, antenna 40-5 may exhibit a relatively strong and stable radiation pattern through the rear face of device 10, thereby optimizing antenna performance despite the small form factor of antenna 40-5 and the close proximity of antenna 40-2 and other device components such as component 82 of FIGS. 5 and 8.

Figure 10:
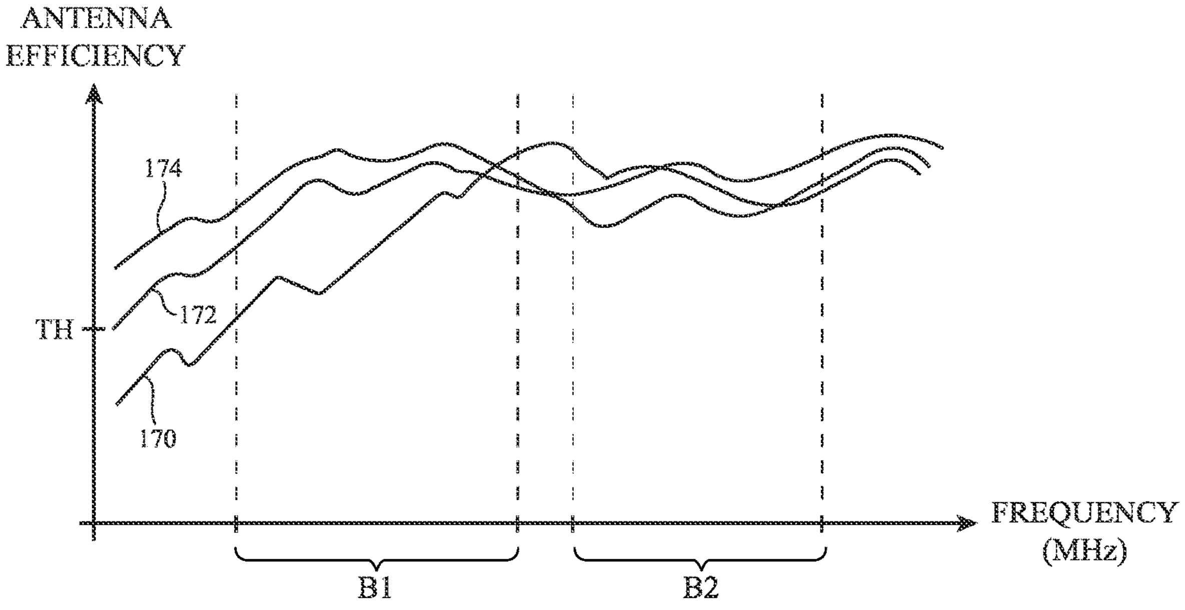
FIG. 10 is a plot of antenna performance (antenna efficiency) as a function of frequency for an illustrative antenna of the type shown in FIGS. 6-9 in accordance with some embodiments.

FIG. 10 is a plot of antenna performance (antenna efficiency) as a function of frequency for antenna 40-5. Curve 170 plots the antenna efficiency of antenna 40-5 in implementations where capacitor 162 (FIG. 9) has a capacitance of 0.3 pF. Curve 172 plots the antenna efficiency of antenna 40-5 in implementations where capacitor 162 has a capacitance of 1.0 pF. Curve 172 plots the antenna efficiency of antenna 40-5 in implementations where capacitor 162 of FIG. 9 is omitted.

As shown by curves 170-174, antenna 40-5 may exhibit a satisfactory level of antenna efficiency (e.g., efficiency greater than threshold TH) across both a first frequency band B1 (e.g., a 5G band around 5000 MHz and 6000 MHz) and a second frequency band B2 (e.g., a Wi-Fi 6E frequency band between around 6000 MHz and 7200 MHz). The inclusion of capacitor 162 (FIG. 9) may serve to boost the efficiency of antenna 40 at relatively high frequencies such as frequencies in band B2. The example of FIG. 10 is illustrative and, in practice, curves 170-174 may have other shapes. Antenna 40-5 may cover any desired frequency bands.

As used herein, the term "concurrent" means at least partially overlapping in time. In other words, first and second events are referred to herein as being "concurrent" with each other if at least some of the first event occurs at the same time as at least some of the second event (e.g., if at least some of the first event occurs during, while, or when at least some of the second event occurs). First and second events can be concurrent if the first and second events are simultaneous (e.g., if the entire duration of the first event overlaps the entire duration of the second event in time) but can also be concurrent if the first and second events are non-simultaneous (e.g., if the first event starts before or after the start of the second event, if the first event ends before or after the end of the second event, or if the first and second events are partially non-overlapping in time). As used herein, the term "while" is synonymous with "concurrent."

Device 10 may gather and/or use personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing is illustrative and various modifications can be made by those skilled in the art without departing from the scope and spirit of the described embodiments. The foregoing embodiments may be implemented individually or in any combination.

What is claimed is:

1. An electronic device comprising:

peripheral conductive housing structures;

a display mounted to the peripheral conductive housing structures;

a housing wall mounted to the peripheral conductive housing structures opposite the display;

a conductive chassis coupled to the peripheral conductive housing structures and interposed between the display and the housing wall;

a dielectric substrate having a first surface and a second surface, the second surface facing the housing wall; and a folded antenna element disposed on the first and second surfaces, wherein the folded antenna element extends from a first end to a second end opposite the first end, the first end is coupled to a positive antenna feed terminal, and the second end is coupled to the conductive chassis.

2. The electronic device of claim 1, wherein the first surface of the dielectric substrate is orthogonal to the second surface of the dielectric substrate.

3. The electronic device of claim 2, wherein a first portion of the folded antenna element is disposed on the first surface and extends from the first end to the second surface, a second portion of the folded antenna element is disposed on the first surface and extends from the second end to the second surface, and a third portion of the folded antenna element is disposed on the second surface and couples the first portion of the folded antenna element to the second portion of the folded antenna element.

4. The electronic device of claim 3, wherein the third portion of the folded antenna element comprises a first segment that extends from the second portion of the folded antenna element, a second segment that extends from the first segment and orthogonal to the first segment, a third segment that extends from the second segment and orthogonal to the second segment, and a fourth segment that extends from the third segment to the first portion of the folded antenna element, the fourth segment being parallel to the second segment.

5. The electronic device of claim 4, wherein the second portion of the folded antenna element comprises a fifth segment that extends from the first segment, a sixth segment that extends from the fifth segment and orthogonal to the fifth segment, and a seventh segment that extends from the sixth segment to the second end of the folded antenna element, the seventh segment being parallel to the fifth segment.

6. The electronic device of claim 5, wherein the folded antenna element further comprises a fourth portion on a third surface of the dielectric substrate, the third surface is parallel to the second surface of the dielectric substrate, and the first portion of the folded antenna element couples the fourth segment to the fourth portion of the folded antenna element.

7. The electronic device of claim 6, wherein the fifth segment is folded, with respect to the first segment, about a first axis, the first portion of the folded antenna element is folded, with respect to the fourth segment, about a second axis parallel to the first axis, and the fourth portion of the folded antenna element is folded, with respect to the first portion of the folded antenna element, about a third axis parallel to the second axis.

8. The electronic device of claim 1, further comprising:

a speaker that includes a portion of the dielectric substrate, the speaker being aligned with one or more holes in the peripheral conductive housing structures.

9. The electronic device of claim 1, further comprising:

a barometric vent that includes a portion of the dielectric substrate, the barometric vent being aligned with one or more holes in the peripheral conductive housing structures.

10. The electronic device of claim 1, further comprising:

a microphone that includes a portion of the dielectric substrate, the barometric vent being aligned with one or more holes in the peripheral conductive housing structures.

11. The electronic device of claim 1, further comprising:

a flexible printed circuit;

a radio-frequency transmission line path having a signal conductor on the flexible printed circuit;

a contact pad on the flexible printed circuit and coupled to the signal conductor; and a conductive spring finger that couples the contact pad to the first end of the folded antenna element at the positive antenna feed terminal.

12. The electronic device of claim 11, wherein the flexible printed circuit comprises a tail and the electronic device further comprises:

a first antenna that includes the folded antenna element;

a first conductive screw that couples the tail of the flexible printed circuit to a segment of the peripheral conductive housing structures, the segment forming at least part of an antenna resonating element for a second antenna; and a second conductive screw that couples the second end of the folded antenna element to the conductive chassis.

13. The electronic device of claim 1, wherein a first portion of the folded antenna element is disposed on the first surface, a second portion of the folded antenna element is disposed on the second surface, the second surface is non-parallel to the first surface, and the folded antenna element is configured to exhibit greater peak current magnitude in the first portion than in the second portion of the folded antenna element.

14. The electronic device of claim 1, wherein the peripheral conductive housing structures include a segment extending between a first dielectric-filled gap and a second dielectric-filled gap, wherein the folded antenna element overlaps the segment.

15. The electronic device of claim 14, wherein the folded antenna element forms a first antenna resonating element of a first antenna and the electronic device further comprises a second antenna that includes a second antenna resonating element formed from the segment.

16. The electronic device of claim 15, wherein the first surface of the dielectric substrate is non-parallel with respect to the second surface of the dielectric substrate.

17. The electronic device of claim 16, further comprising:

a flexible printed circuit having a conductive trace and having a tail;

a conductive screw that attaches the tail of the flexible printed circuit to the segment of the peripheral conductive housing structures and that electrically couples the conductive trace to the segment of the peripheral conductive housing structures;

a radio-frequency transmission line for the first antenna, the radio-frequency transmission line having a signal trace on the flexible printed circuit, wherein the dielectric substrate has a third surface opposite the second surface; and a conductive spring that couples the signal trace to the folded antenna element at the third surface of the dielectric substrate.

18. The electronic device of claim 1, wherein the dielectric substrate has a third surface that couples the first surface to the second surface, the folded antenna element comprising:

a first segment on the first surface and coupled to the positive antenna feed terminal;

a second segment that extends, from the first segment, along the third surface;

a first portion that extends, from the second segment, along a first meandering path on the second surface; and a second portion that extends, from the first portion to the second end, along a second meandering path on the third surface.

19. The electronic device of claim 18, wherein the first portion of the folded antenna element comprises:

a third segment that is coupled to the second segment and that extends from the second segment along a first longitudinal axis;

a fourth segment that is coupled to the third segment and that extends from the third segment along a second longitudinal axis orthogonal to the first longitudinal axis;

a fifth segment that is coupled to the fourth segment and that extends from the fourth segment along a third longitudinal axis parallel to the first longitudinal axis; and a sixth segment that is coupled to the fourth segment and that extends from the fifth segment, to the second portion of the antenna resonating element, along a fourth longitudinal axis parallel to the second longitudinal axis.

20. The electronic device of claim 19, wherein the second portion of the folded antenna element comprises:

a seventh segment that is coupled to the sixth segment and that extends from the sixth segment along a fifth longitudinal axis orthogonal to the fourth and third longitudinal axes;

an eighth segment that is coupled to the seventh segment and that extends from the seventh segment along a sixth longitudinal axis orthogonal to the fifth longitudinal axis; and a ninth segment that is coupled to the eighth segment and that extends from the eighth segment along a seventh longitudinal axis parallel to the fifth longitudinal axis, wherein an end of the ninth segment opposite the eighth segment is coupled to the conductive chassis.

* * * * *